United States Patent
Tan et al.

(10) Patent No.: US 9,384,535 B2
(45) Date of Patent: Jul. 5, 2016

(54) METHODS AND SYSTEMS FOR REDUCING OR ELIMINATING PERCEIVED GHOSTING IN DISPLAYED STEREOSCOPIC IMAGES

(75) Inventors: Weining Tan, Mississauga (CA); Samuel Ziheng Zhou, Mississauga (CA); Steven C. Read, Mississauga (CA)

(73) Assignee: IMAX Corporation, Mississauga, ON ( * ) Notice: Subject to any disclaimer, the term of this patent is extended or adjusted under 35 U.S.C. 154(b) by 674 days.

(21) Appl. No.: 12/996,028

(22) PCT Filed: Jun. 15, 2009

(86) PCT No.: PCT/IB2009/005945
§ 371 (c)(1),
(2), (4) Date: Dec. 3, 2010

(87) PCT Pub. No.: WO2009/150529
PCT Pub. Date: Dec. 17, 2009

(65) Prior Publication Data
US 2011/0080401 A1  Apr. 7, 2011

Related U.S. Application Data

(60) Provisional application No. 61/061,306, filed on Jun. 13, 2008.

(51) Int. Cl.
  *G06T 5/00* (2006.01)
  *H04N 13/00* (2006.01)
  *G06T 5/50* (2006.01)

(52) U.S. Cl.
CPC . *G06T 5/008* (2013.01); *G06T 5/50* (2013.01); *H04N 13/0018* (2013.01); *G06T 2207/10012* (2013.01); *G06T 2207/20182* (2013.01)

(58) Field of Classification Search
CPC ........... G06T 2207/10012; G06T 2207/20182; G06T 5/008; G06T 5/50; H04N 13/0018
See application file for complete search history.

(56) References Cited

U.S. PATENT DOCUMENTS 5,758,036 A  5/1998 Scarpetti
6,157,424 A  12/2000 Eichenlaub
(Continued)

FOREIGN PATENT DOCUMENTS

EP  0 506 302 B1  9/1992
EP  1 460 611 A1  9/2004
(Continued)

OTHER PUBLICATIONS

Smit et al.,("Non-Uniform Crosstalk Reduction for Dynamic Scenes", Virtual Reality Conference, 2007. VR '07. IEEE , vol., No., pp. 139,146, Mar. 10-14, 2007).*
(Continued)

*Primary Examiner* — Behrooz Senfi
*Assistant Examiner* — Maria Vazquez Colon
(74) *Attorney, Agent, or Firm* — Kilpatrick Townsend & Stockton LLP

(57) ABSTRACT

Methods and systems for reducing or eliminating perceived ghosting in stereoscopic three-dimensional (3D) image display are described. A stereoscopic image that includes image content can be received. Display system parameters can be received. A local region of the stereoscopic image can be identified using the image content. The local region can include ghosting. Psychovisual factors can be selected using the image content. A modified stereoscopic image can be generated from the stereoscopic image by reducing or eliminating the ghosting of the local region using the psychovisual factors and the display system parameters. The modified stereoscopic image can be outputted for display.

31 Claims, 16 Drawing Sheets

(56) References Cited

U.S. PATENT DOCUMENTS

| | | | |
|---|---|---|---|
| 6,532,008 B1* | 3/2003 | Guralnick | 345/419 |
| 2005/0180006 A1 | 8/2005 | Mendoza | |
| 2005/0190258 A1 | 9/2005 | Siegel et al. | |
| 2009/0244266 A1* | 10/2009 | Brigham | 348/51 |
| 2010/0321382 A1 | 12/2010 | Amaratunga et al. | |
| 2011/0025832 A1 | 2/2011 | Cowan et al. | |
| 2014/0160301 A1 | 6/2014 | Tan et al. | |

FOREIGN PATENT DOCUMENTS

| | | |
|---|---|---|
| EP | 1 460 857 A1 | 9/2004 |
| JP | 2011091516 | 5/2011 |
| WO | WO 2005/078663 | 8/2005 |
| WO | WO 2005/101324 A1 | 10/2005 |
| WO | WO/2009/150529 | 12/2009 |
| WO | 2011071488 | 6/2011 |
| WO | 2013011491 | 1/2013 |

OTHER PUBLICATIONS

Lacotte (Elimination of Keystone and crosstalk effects in stereoscopic video; Rapport technique de l'INRS-Télécommunications No. 95-31, Dec. 22, 1995; pp. 1-27).*
Konrad et al. (Cancellation of Image Crosstalk in Time Sequential Displays of Stereoscopic Video; IEEE Transactions on Image Processing; vol. 9, No. 5; May 2000; pp. 897-908).*
Smit et al.,("Non-Uniform Crosstalk Reduction for Dynamic Scenes", Virtual Reality Conference, 2007. VR '07. IEEE, vol., No., pp. 139, 146, Mar. 10-14, 2007).*
Lacotte ("Elimination of Keystone and crosstalk effects in stereoscopic video"; Rapport technique del'INRS-Télécommunications No. 95-31, Dec. 22, 1995; pp. 1-27).*
Woods et al., "Charaterising Sources of Ghosting in Time-Sequential Stereoscopic Video Displays", presented at Stereoscopic Displays and Applications XIII, published in Stereoscopic Displays and Virtual Reality Systems IX, Proceedings of SPIE vol. 4660, San Jose, California, Jan. 21-23, 2003.*
"Stereoscopic displays and virtual reality systems IX," Proc SPIE int Soc Opt Eng, Vool. 4660, (2002). 520 pages.
International Application No. PCT/IB2009/005945, International Search Report and Written Opinion mailed on Sep. 30, 2009, 11 Pages.
International Application No. PCT/IB2009/005945, International Preliminary Report on Patentability mailed on Dec. 23, 2010, 7 Pages.
Bos, "Performance limits of stereoscopic viewing systems using active and passive glasses," IEEE Virtual Reality Annual International Symposium, 1993, 2 Pages.
Eichenlaub. "An autostereoscopic display with high brightness and power efficiency," Proceedings of the SPIE—The International Society for Optical Engineering, Proc. SPIE—Int. Soc. Opt. Eng., vol. 2177, 1994, pp. 4-15.
Feiner, et al. "Cutaways and ghosting: satisfying visibility constraints in dynamic 3D illustrations," Visual Computer, vol. 8, No. 5-6, Jun. 1992, pp. 292-302.
Hoshino, et al. "A study on resolution and aliasing for multi-viewpoint image acquisition," IEEE Transactions on Circuits and Systems for Video Technology, vol. 10, No. 3, Apr. 2000, pp. 366-75.
Hsu, et al., "Design of studies to test the effectiveness of stereo imaging truth or dare: is stereo viewing really better?" Proceedings of SPIE—The International Society for Optical Engineering v 2177 1994. Publ by Society of Photo-Optical, Instrumentation Engineers, Bellingham, WA, USA. 1994, pp. 211-222.
Ideses, et al. "Three methods that improve the visual quality of colour anaglyphs," Journal of Optics A: Pure and Applied Optics, J. Opt. A, Pure Appl. Opt., vol. 7, Number, Dec. 12, 2005, pp. 755-762.
Noble, et al. , "Reducing ghosting on switched-image stereo systems," Programming and Computer Software, vol. 24, No. 5, Sep.-Oct. 1998, pp. 257-263.
Pommeray, et al. "Image crosstalk reduction in stereoscopic laser-based display systems," Journal of Electronic Imaging, vol. 12 No. 4, Oct. 2003, pp. 689-696.
Siegel, "Perceptions of crosstalk and the possibility of a zoneless autostereoscopic display," Proceedings of the SPIE—The International Society for Optical Engineering, vol. 4297, 2001, pp. 34-41.
Stelmach,, et al. "Perceptual basis of stereoscopic video," Proceedings of the SPIE—The International Society for Optical Engineering, vol. 3639, 1999, pp. 260-265.
Tengcharoen, et al. "Image ghosting elimination in an I-frame of interlaced 3D-video,"First International Conference on Mechatronics. Mechatronics—An Integrated Engineering for the New Millennium. Conference Proceedings, vol. 2, 2001, pp. 409-418. (Abstract).
Walworth, et al. "Efficiency of polarization optics in viewing stereoscopic images," Proceedings of the SPIE—The International Society for Optical Engineering, Proc. SPIE—Int. Soc. Opt. Eng., vol. 4297, 2001, pp. 8-13.
Weigel, et al. "Ghost image debugging on a 240 degree fisheye lens," Proceedings of the SPIE—The International Society for Optical Engineering, vol. 2774, 1996, pp. 598-609.
Wilcox, "Determinants of perceived image quality: ghosting vs. brightness," Proceedings of the SPIE—The International Society for Optical Engineering, Proc. SPIE—Int. Soc. Opt. Eng. (USA), vol. 5006, 2003, pp. 263-268.
Woods, et al. "Characterizing sources of ghosting in time-sequential stereoscopic video displays," Proceedings of the SPIE—The International Society for Optical Engineering, vol. 4660, 2002, pp. 66-77.
Woods et al., "Ghosting in anaglyphic stereoscopic images," Proceedings of the SPIE—The International Society for Optical Engineering, vol. 5291, No. 1, 2004. pp. 354-365.
Office Action for Chinese Application No. CN 200980131556.1, mailed Oct. 8, 2012, 17 pages.
Chinese Patent Application No. 200980131556.1, Second Office Action, mailed May 14, 2013, 6 pages (3 pages Office Action, 3 pages English Translation).
Boev et al., "Crosstalk Measurement Methodology for Auto-Stereoscopic Screens", 3DTV Conference, IEEE, PI, May 1, 2007, pp. 1-4.
European Patent Application No. 09762057.9, Extended European Search Report, mailed Jul. 25, 2013, 9 pages.
Konrao et al., "Cancellation of Image Crosstalk in Time-Sequential Displays of Stereoscopic Video", IEEE Transactions on Image Processing, vol. 9, No. 5, May 1, 2000, pp. 899-901.
Chinese Patent Application No. 200980131556.1, Office Action, issued Nov. 19, 2013, 22 pages.
Chinese Application No. 200980131556.1, Fourth Office Action mailed on Jun. 16, 2014, 28 pages.
Chinese Application No. 200980131556.1, Office Action mailed on Dec. 23, 2014, 28 pages.
Chinese Patent Application No. 200980131556.1, Office Action mailed on May 11, 2015, 13 pages for the original document and 20 pages for the English translation.
Canadian Patent Application No. 2,727,218, Office Action mailed Jun. 2, 2015, 4 pages.

* cited by examiner

METHODS AND SYSTEMS FOR REDUCING OR ELIMINATING PERCEIVED GHOSTING IN DISPLAYED STEREOSCOPIC IMAGES

CROSS REFERENCE TO RELATED APPLICATIONS

This application claims priority to U.S. Provisional Application Ser. No. 61/061,306, titled "Methods and Systems for Ghosting Elimination in Displayed Stereoscopic Images," filed Jun. 13, 2008, the entire contents of which is incorporated herein by reference.

FIELD OF THE DISCLOSURE

Embodiments of the inventive concepts disclosed herein relate generally to the field of image processing. Particular embodiments are directed to eliminating or otherwise reducing perceived ghosting in stereoscopic images.

BACKGROUND

The perception of depth from stereoscopic images was illustrated centuries ago with stereoscopic drawings. Such technology entered the photographic age in 1838, following a description by Charles Wheatstone to the Royal Scottish Society of Arts. Stereoscopic images are formed by two two-dimensional (2D) images of a single scene taken from slightly different perspectives. These two slightly different images are analogous to the slightly different views from the left and right eyes of a human viewer. The illusion of depth by a three-dimensional (3D) image from two 2D images is produced when the "left" image of the stereoscopic pair of images is processed by the viewer's left eye only and the "right" image is processed by the viewer's right eye.

A variety of 3D image display apparatuses have been developed over the centuries for the separation and discrete transmission of left and right stereoscopic images to the appropriate eyes of the viewer. Examples of such stereoscopic display apparatuses include color-separation anaglyph filters, polarizing filters, wavelength-multiplexing INFITEC filters and time-sequential LCD shutter glasses. Most of these apparatuses suffer from ghosting artifacts that result from information leakage, often referred to as "crosstalk", between one perspective view of the stereoscopic pair to the other view (e.g. from the left eye to the right eye or from the right eye to the left eye). Because of ghosting, the left eye of a viewer sees a portion of information from the right eye image in addition to the appropriate left eye image, and vice versa. Ghosting in 3D images can compromise the image quality of a stereoscopic 3D display. While stereoscopic display apparatuses deliver 3D effects, most cannot eliminate crosstalk and thus cannot deliver ghosting-free 3D images. Furthermore, current efforts that seek to eliminate crosstalk in display devices are difficult and costly. In one approach, for example, two separating techniques are used at the same time, such as using polarization and shutter glasses, which provides significant reduction in ghosting. However, the economics of setting up and maintaining such a system becomes too costly in a very competitive commercial cinema market.

Cinema presentations are changing from film based projection to projecting from a digital storage medium. For 3D presentations that experience ghosting, it is now possible to manipulate image content on a pixel-by-pixel basis. This aspect can be used to reduce ghosting in digitally projected stereoscopic presentations. Digital image processing techniques, for example, have been developed that seek to reduce ghosting by modifying image data. Examples of these methods include reducing ghosting by subtracting ghosting artifacts from images and reducing ghosting by changing the brightness of an image to facilitate ghosting artifact subtraction. Additional examples follow.

G. Street (EP 0819359) describes a method to enhance stereoscopic display quality by reconditioning each channel via an inverted crosstalk matrix to cancel the crosstalk. The method accounts for the viewer's location. The matrix is a simple optical crosstalk model and can subtract ghosting from each eye's image. To make the matrix always solvable, an overall neutral bias is imposed. However, measuring parameters of the model can be difficult.

Sebastien Weitbruch (EP 1460857) describes a method of compensating for ghosting images in time sequential stereoscopic images where crosstalk is produced in a system by phosphor lag. The method seeks to withdraw the percentage of crosstalk in an image from the original image and, where the original image level was zero (0), globally adds a maximum level of the ghosting image to hide the ghosting. The method is limited by a resulting loss of contrast of the whole image or compromised by allowing a certain amount of ghosting.

James Libscomb, Tomas Watson and Wayne Wooten, "Reducing crosstalk between stereoscopic views," in Stereoscopic Displays and Virtual Reality Systems IX, Proceedings of SPIE Vol. 2177, pp. 92-96 (February 1994) describes a method of reducing crosstalk by globally boosting a dark background to a grey level, compressing the image's dynamic range and then subtracting a predefined crosstalk from the other image of the stereoscopic pair. However, the methods are heuristic and inapplicable to complicated images as it may be limited to artificial representation images.

Janusz Konrad "Cancellation of image crosstalk in time-sequential displays of stereoscopic video," in IEEE Transactions on Image Processing, Vol. 9, No. 5, pp 897-908 (May 2000) describes a method for conducting psychovisual calibration by defining a human psychovisual model in a set of mapping LUTs. By brute force, the model maps the original image to a processed image. The method may produce a highly distorted image even though ghosting is alleviated. The calibration process uses limited psychovisual sampling points and is dependent on specified 3D system physical characteristics. Furthermore, the method does not separate psychovisual effects from system characteristics. The system, by its nature, has low accuracy and does not allow for automatic use.

Manly Cain "Improving 3D Anaglyphs Through Image Processing," http://www.rmcain.com/pageserver.mv?MCAMA3DUpdate (copyright 1999) describes a method for reducing ghosting by adjusting the z-axis distance to achieve a minimum ghosting level while retaining the original relative depth. The method is, however, heuristic and fully manual. In addition, changing z-axis distance may not be possible in all circumstances or applications.

Cowan et al. (U.S. Patent Pub. No. 2006/0268104) describes a ghosting compensation method and system for improving stereoscopic projection. The method and system divides the projection screen into a plurality of regions, each with a potentially different ghosting profile. A simple model is used to estimate possible ghosting from an image of one eye and subtract it from the original image. Human psychovisual factors are ignored and, therefore, the method and system may not be effective or may otherwise result in undesirable artifacts, especially in a multiple view environment. Furthermore, no content-based local ghosting removal operations are performed.

Brian Guralnick (U.S. Pat. No. 6,532,008) describes a user interactive software environment in which the user may manually eliminate ghosting effects through a graphical user interface (GUI) and image editor and composer methods. A simulation and evaluation apparatus is described. The ghosting reduction process is a combination of selected positive percentages and negative percentages of the original images. In cases where final images are negative, a percentage of white is added globally.

S. Klimenko "Crosstalk reduction in passive stereo-projection systems," EUROGRAPHICS 2003 describes a method for the reduction of crosstalk in a passive stereo-projection system. This method involves the subtraction of a proportion of leakage in one eye image from the other eye image. If necessary, a constant amount of color is added to the image. The method potentially results in an undesirably bright background area in images.

Other Related References include: John Ross et al., "Contrast Adaptation and Contrast Masking in Human Vision," Speed Proceedings: Biological Sciences, Vol. 246, No. 1315 (Oct. 22, 1991), pp. 61-70).

One problem with eliminating ghosting in a stereoscopic image is that ghosting subtraction techniques specified above are limited in situations where ghosting cannot be completely subtracted in all portions of the image. Some methods are able to remove ghosting, but the original image is modified more than a viewer may find acceptable, as compared to leaving some ghosting artifacts in the image. For example, if only ghosting subtraction methods are applied, an adequate amount of image brightness in a dark area of the image is needed to subtract light in the area where ghosting occurs. Modifying an image by applying a fixed amount of brightness globally can remove ghosting by subtraction, but overall image contrast may be negatively impacted. Another approach is to balance the amount of overall image brightness offset with the amount of ghosting removed. In general, conventional approaches are applied globally to the image and are not particularly effective for displayed 3D images having a wide dynamic range of ghosting. Ghosting removal can be problematic when an image includes several regions that do not require any offset in brightness to subtract ghosting and includes many regions that require a significant amount of brightness offset to subtract ghosting. Such images may contain a combination of regions that are impacted by bright daylight and regions that are in dark shade.

Accordingly, approaches that overcome the limitations described above are desirable that can minimize original image modification and maximize perceived ghosting reduction.

SUMMARY

According to one embodiment of the present invention, ghosting in stereoscopic images is reduced within a range such that modifications to the images to reduce ghosting are not perceptible to the human eye. Psychovisual factors can be used to determine a threshold under which to modify images such that ghosting is not perceptible by a human eye and alterations to the image are minimized. In an embodiment, a stereoscopic image that includes image content is received. Display system parameters, which may be of a display system, are received. At least one local region of the stereoscopic image is identified using the image content. The at least one local region includes ghosting. Psychovisual factors are selected using the image content. A modified stereoscopic image is generated from the stereoscopic image by reducing or eliminating the ghosting of the at least one local region using the psychovisual factors and the display system parameters. The modified stereoscopic image is outputted for display.

In some embodiments, ghosting that is not perceptible to a human may remain in the image to minimize image alternation. Display system parameters along with psychovisual factors can be used to generate control masks used to modify the images. The control masks can include information on how to modify the images to reduce ghosting and minimize image alteration. While some embodiments are generally suitable for any type of 3D stereoscopic display systems, certain embodiments may be particularly effective in large-format motion picture theaters with an immersive 3D viewing environment. Using psychovisual factors and display system characteristics, separately or together, can allow for flexible system implementations, such as real-time systems in 3D display devices, offline processing systems, and hybrid systems that may include real-time and offline processing components.

These illustrative embodiments are mentioned not to limit or define the invention, but to provide examples to aid understanding of the inventive concepts disclosed in this application. Other aspects, advantages, and features of the present invention will become apparent after review of the entire application, including the following sections: Brief Description of the Drawings, Detailed Description, and Claims.

DETAILED DESCRIPTION

Figure 1:
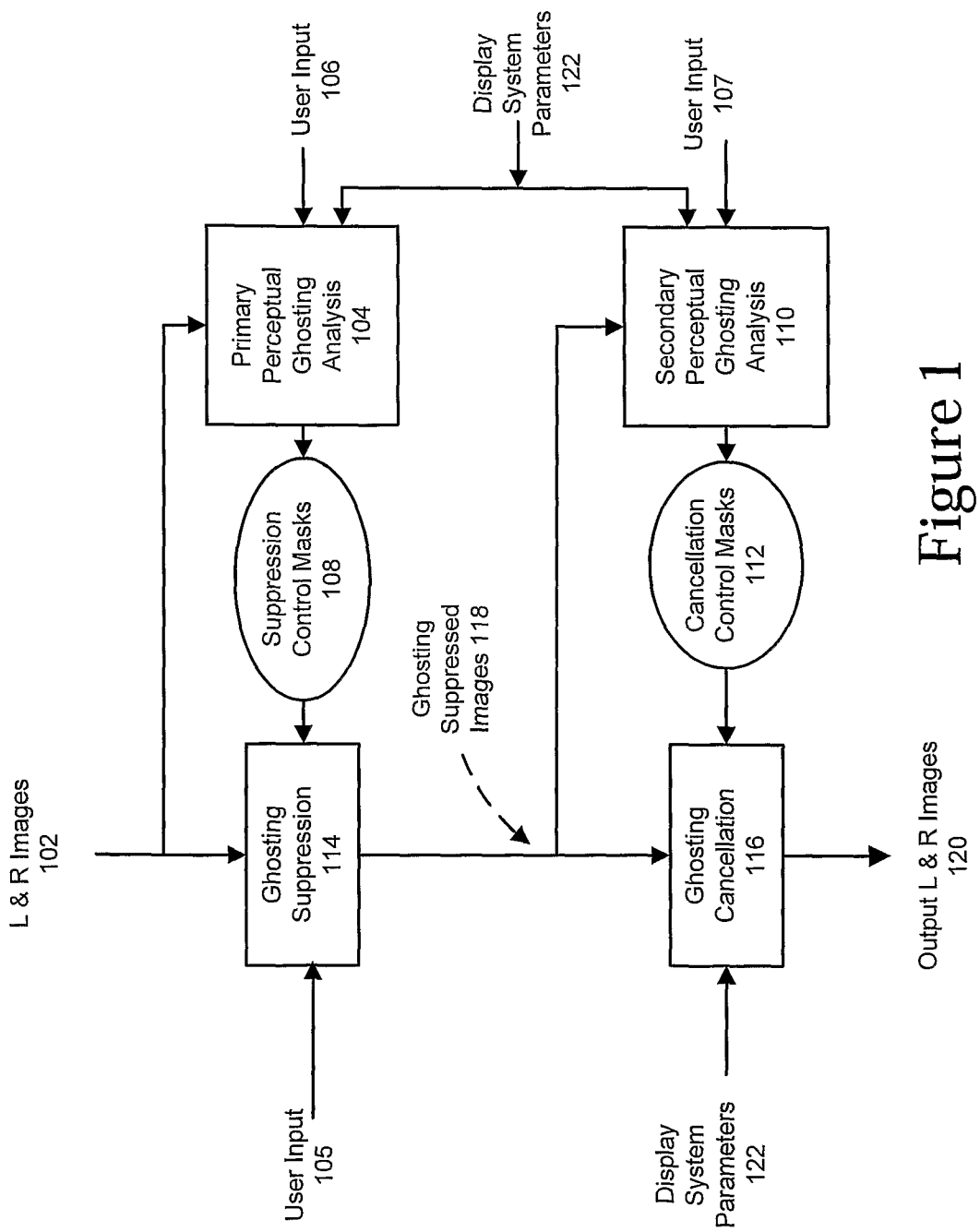
FIG. 1 is a process flow diagram of perceived ghosting reduction or elimination in displayed 3D images according to one embodiment of the present invention.

Certain aspects and embodiments of the inventive concepts disclosed herein relate to methods and systems for reducing or eliminating perceived ghosting in images of a 3D display system. Alteration of the appearance of the images may be minimized. In some embodiments, content-adaptive image analysis techniques are used to analyze perceived ghosting based on, among other things, human psychovisual factors with respect to the image content and characteristics of the display system for displaying images. In some embodiments, original images are received that include local regions and image content. A local region may be a pixel or a group of pixels that share common image content. Image content may be characteristics of an image. A local region of the original image may be identified as having ghosting. A control mask can be generated by analyzing the local region using the image content. The control mask may include a psychovisual factor selected using the image content. A modified image can be generated from the original image data by modifying the local region using the control mask that includes the psychovisual factor. The modified image can be outputted for display.

For illustrative purposes, exemplary embodiments of the present invention are described with respect to stereoscopic projection display systems. However, given the teachings of the present description, those skilled in the art will be able to extend the concepts disclosed to any stereoscopic image display system. Furthermore, the term "stereoscopic" may be used herein interchangeably with the term "three dimensional" or "3D". The term "ghosting reduction" may be used herein interchangeably with the term "ghosting elimination" or "ghosting reduction or elimination".

In some embodiments, ghosting reduction methods and systems use psychovisual factors to analyze and/or modify images. A "psychovisual factor" as used herein is a condition that influences how a human eye and mind processes and interprets visual information perceived by the human. Psychovisual factors may be dependent on image content. By using one or more identified psychovisual factors to modify original images in non-perceptible ways, ghosting can be reduced and changes to the original images can be minimized. For example, images may be processed to perform a non-perceptible image change, which is a change made to a local region of an image that may not be detectable by the human eye and mind. In some embodiments, modified images may retain non-perceptible ghosting, which is ghosting that is not detectable or easily detectable by the human eye and mind.

Ghosting in images may be experienced by a viewer that detects the presence of inter-image contrast between a left and right image pair. However, when the inter-change contrast is relatively small viewers may be unable to detect ghosting. Inter-image contrast may depend on image content and thus the ability of the viewer to detect ghosting may depend in image content. Furthermore, inter-image contrast within a non-perceptible ghosting threshold may be undetectable by a viewer. By determining the non-perceptible ghosting threshold associated with inter-image contrast between a left and right image pair, ghosting reduction can be applied within a non-perceptible level.

Various psychovisual factors may be used to modify images. The following describes examples of such psychovisual factors. Other psychovisual factors, however, can be implemented by various embodiments of the present invention.

One psychovisual factor is the inability of a human eye to detect the presence of ghosting in a "busy" or "heavily" textured local region of an image. In contrast, ghosting may be more perceivable in a relatively smooth or "flat" image region. A non-perceptible ghosting threshold can be scaled with texture by analyzing the texture in a local region of an image where ghosting occurs.

Another psychovisual factor is the inability of a human eye to detect the presence of ghosting in a local region where features are in motion. For example, features may be in fast motion. Ghosting may be more perceivable when features are not moving or are moving slowly. A non-perceptible ghosting threshold can be scaled by analyzing the motion of a local region where ghosting occurs in an image.

Another psychovisual factor is the inability of a human eye to detect the presence of ghosting in a local region having a small amount of parallax associated with it. For a local region with small parallax, the 3D image may appear further away from the viewer and even behind the screen. In such a case, the ability of the human eye to detect the presence of ghosting may be diminished. A non-perceptible ghosting threshold can be scaled by analyzing the parallax of a local region. In wide field of view 3D presentations, such as IMAX® 3D presentations, image objects can be brought forward of the screen and the human eye may be more sensitive to ghosting associated with a large parallax. Characterizing the psychovisual factor associated with parallax of images very close to the viewer and possible large objects in an image can minimize ghosting.

Another psychovisual factor is the inability of a human eye to detect small and gradual spatial changes in brightness of a local region of an image. Such inability may be related to non-perceptible changes in brightness of local regions. Such changes can include modifying the brightness of a local region of an image to reduce ghosting sources without a perceived impact to the local region's appearance. Similarly, gradual increases of image brightness of a local region that is dark may also facilitate ghosting reduction. For example, brightness change of the local region may be spread out within the region. A level of change to a local region to reduce ghosting can occur below a non-perceptible threshold by analyzing the change in brightness of a local region with ghosting.

Another psychovisual factor is the ability of a human eye to detect a transition, such as a sharp transition, in brightness in local regions, for example between a dark local region and a bright edge of a local region with ghosting. Accordingly, the non-perceptible ghosting threshold associated with brightness transitions may be low. The non-perceptible ghosting threshold can be scaled by analyzing brightness transitions associated with a local region having ghosting.

Another psychovisual factor is that the human eye's ability to detect the presence of spatial brightness changes diminishes as the brightness of an image region increases. For brighter local regions, greater spatial changes in brightness can be had within the local regions. A non-perceptible ghosting threshold can be scaled by analyzing the brightness level of a local region that has ghosting.

Another psychovisual factor is based on the non-linear characteristic of the perception of the human eye to image brightness. Ghosting can be reduced by modifying a local region of an image within non-perceptible levels through characterizing the human eye with respect to image brightness.

Psychovisual factors can be applied in several ways to facilitate ghosting reduction. In a 3D motion picture, the influence of a content-dependent psychovisual factor can be confined within limited local regions of an image space and within limited segments of image frames. Appropriate image analysis methods can be used to identify these local regions and segments. The influence of a psychovisual factor towards ghosting perception can further be described by a weighting function that varies from pixel to pixel. The combined result of different content-dependent psychovisual factors can be described by 2D masking functions referred to as control masks. Control masks represent the computations to be applied to the local regions identified to modify the image and represent the location and scaling of the computations. Control masks according to certain embodiments of the present invention are created by analyzing content of original images.

Using content-dependent psychovisual factors to reduce ghosting can avoid eliminating ghosting completely, where such complete elimination may distort image appearance, while resulting in images in which ghosting appears to be eliminated. For example ghosting may be reduced below detectable limits of the human eye for distinguishing image content. By using one or more psychovisual factors, a greater degree of latitude in modifying original image data to eliminate perceived ghosting can be experienced, while, minimizing actual changes to the original image data. For example, by defining and modeling human psychovisual perceptual limitations into psychovisual factors, ghosting in local regions of images can be reduced through modifying such local regions to improve stereoscopic presentations compared to those resulting from other attempts to reduce or eliminate ghosting.

Ghosting reduction methods according to some embodiments use one or more psychovisual factors and are generally suitable for any type of 3D stereoscopic display system. Such methods may have particular applicability to large-format motion picture theaters with an immersive 3D viewing environment. Certain embodiments separate the human psychovisual aspects from the display system characteristics, allowing for flexible system implementations, including real-time systems in 3D display devices, offline processing systems, and hybrid systems with both real-time and offline processing components.

FIG. 1 shows a method for reducing or eliminating perceived ghosting through a functional block diagram according to one embodiment of the present invention. A sequence of original images that are left eye images and right eye images 102 with ghosting is received. Ghosting may be reduced by modifying the original left eye and right eye images through one or more computing processes. The original left eye images and right eye images 102 can be analyzed by an image analysis process that is a primary perceptual ghosting analysis process 104. The primary perceptual ghosting analysis process 104 estimates the level of perceived ghosting when the images are exhibited on a stereoscopic 3D display system, and then determines how to modify the original images to reduce or eliminate the perceived ghosting. The primary perceptual ghosting analysis process 104 may include receiving one or more types of display system parameters 122.

The display system parameters 122 describe the characteristics, with respect to perceived ghosting, of a 3D display system on which the images are to be displayed. Different types of stereoscopic 3D display systems may have different sets of display system parameters and each individual 3D display system may have distinctive display system parameters. Display system parameters 122 can be obtained by applying a calibration process to the 3D display system to measure its characteristics related to perceived ghosting. In other embodiments, a representative set of parameters may be used as default display system parameters. The primary perceptual ghosting analysis process 104 may also receive display system parameters through user inputs 106 that are provided by a user through a software GUI and/or using various types of input devices.

Computing processes can also include a ghosting suppression process 114 and a ghosting cancellation process 116. The ghosting suppression process 114 can modify the original left eye images and right eye images 102 to facilitate perceived ghosting reduction. The ghosting cancellation process 116 can further modify the images to eliminate perceived ghosting or otherwise reduce it further. The ghosting suppression process 114 can modify the original left eye images and right eye images 102 in a local and adaptive way to avoid unacceptable changes to the appearance of modified images of the original left eye images and right eye images 102. To minimize such changes, a primary perceptual ghosting analysis process 104 can be used to estimate perceived ghosting by analyzing the content of the original images and using appropriate psychovisual factors, such as those described previously. The primary perceptual ghosting analysis process 104 can determine computing processes to be applied to the original left eye images and right eye images 102 to reduce or eliminate estimated perceived ghosting.

The primary perceptual ghosting analysis process 104 can determine a location of the original left eye images and right eye images 102 to apply the computations and the method for applying the computations. Since the level of perceived ghosting may be dependent on image content, the primary perceptual ghosting analysis process 104 outputs such content dependent decisions as one or more suppression control masks 108. Suppression control masks 108 may be of various types. Each type of control mask can be used to guide a specific computing process to modify images in a local and content-adaptive way. Embodiments of a control mask are a form of a grayscale image in which each pixel value, or code value, defines the extent, or a scale, with which a specific computing process is to be applied to a corresponding pixel of an image. If different scales are provided for different color channels of the image, a control mask can be represented by an RGB image in which a code value of a certain color channel defines a scale with which a specific computing process is to be applied to the corresponding channel of an original image pixel. In either case, a non-zero code value in a control mask can define an active pixel position, and a collection of active pixels can define an active local region in the image. In any event, a control mask can define the active local regions in an image and the corresponding scales with which a computing process is to be applied to the active local regions. A distinctive control mask for each specific computing process to reduce ghosting may be generated and used for each frame of an image.

The suppression control masks 108 from the primary perceptual ghosting analysis process 104 can be used to guide the ghosting suppression process 114 to perform local and content-adaptive computing on the original left eye images and right eye images 102. The result from this process may be ghosting suppressed images 118, which can be further modified by the ghosting cancellation process 116. The ghosting cancellation process 116 can modify the ghosting suppressed images 118 to achieve maximum reduction in perceived ghosting. In some embodiments, complete elimination of perceived ghosting can be achieved.

The ghosting cancellation process 116 can modify images in a local and adaptive way to maximize ghosting reduction and minimize alteration to the image data. Such a local and content-adaptive computing practice can be guided by cancellation control masks 112 produced by a secondary perceptual ghosting analysis process 110. Some embodiments of the secondary perceptual ghosting analysis process 110 can perform a more accurate estimation of perceived ghosting from the images that have been modified by the ghosting suppression process 114. Similar to the primary perceptual ghosting analysis process 104, the secondary perceptual ghosting analysis process 110 can analyze the content of the images by determining appropriate psychovisual factors. Based on the result of such analysis, the secondary perceptual ghosting analysis process 110 can determine the location of local regions in each image frame that are active and the scale to use in the ghosting cancellation process 116. Such determinations can be provided to the ghosting cancellation process 116 using cancellation control masks 112 that may be similarly structured to those produced by the primary perceptual ghosting analysis process 104. The secondary perceptual ghosting analysis process 110 can receive one or more display system parameters 122, as well as certain types of user input 107.

The ghosting cancellation process 116 can use display system parameters 122 to achieve maximum reduction of perceived ghosting. The display system parameters 122 used may or may not be the same parameters used by both perceptual ghosting analysis processes. In some embodiments, accurate display system parameters may be unavailable and a representative set of parameters may be used as default display system parameters.

The ghosting cancellation process 116 can output modified left eye images and right eye images 120 that exhibit reduced ghosting when displayed on an intended stereoscopic 3D display system. In one embodiment of the present invention, the outputted modified left eye images and right eye images 120 are streamed directly in real-time to the 3D display system for display. In other embodiments, the outputted modified left eye images and right eye images 120 are stored on an image storage device to be displayed at a later time after processing.

Figure 2:
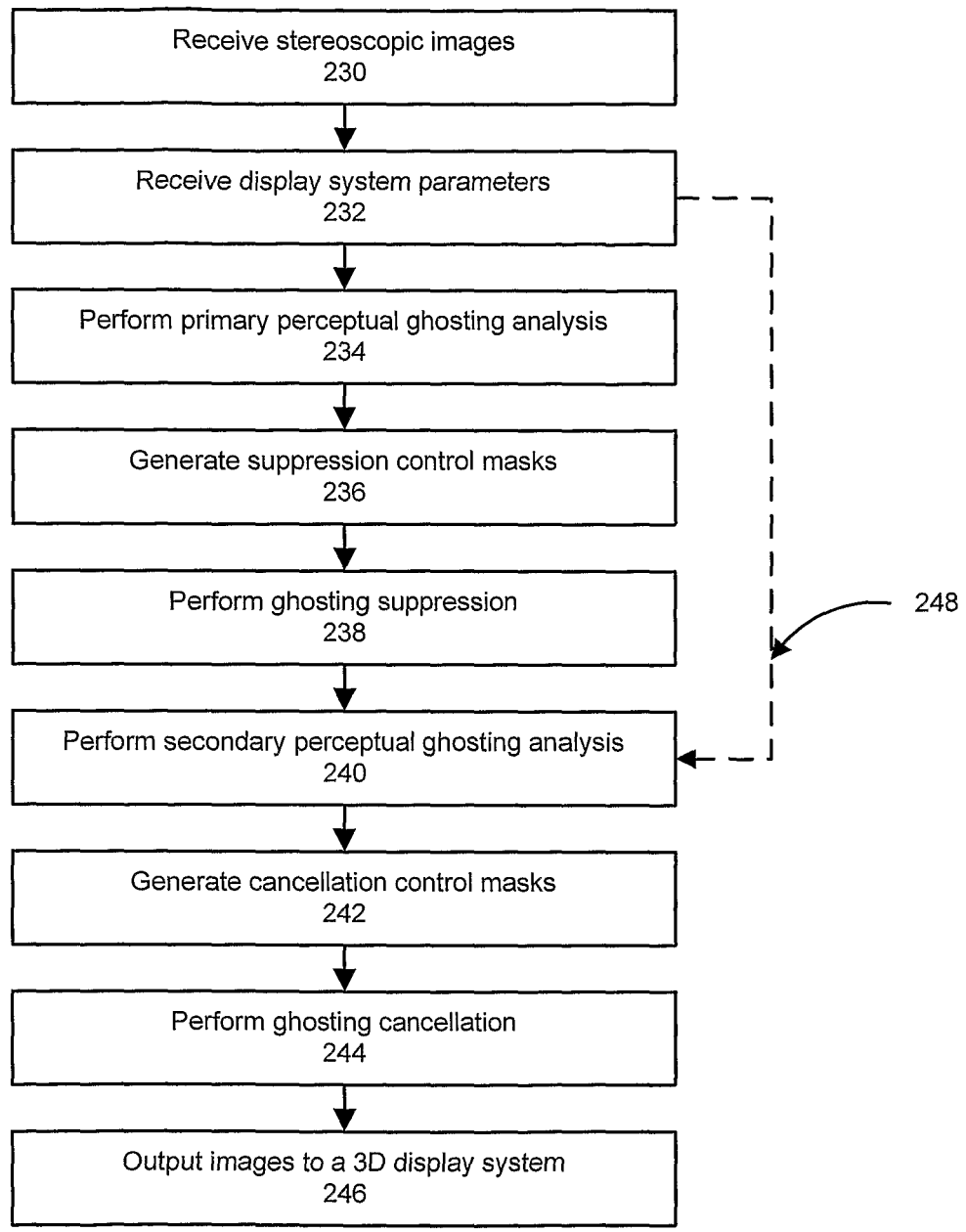
FIG. 2 is a flow diagram of a process for reducing or eliminating perceived ghosting in 3D images according to one embodiment of the present invention.

FIG. 2 shows a process flow in a general system implementation of the method of FIG. 1 according to one embodiment of the invention. In block 230, original stereoscopic images are received. The image can be received from, for example, a cinema image server or a satellite video decoder that can provide images in real-time. In some embodiments, images are received from a hard drive or a data tape that can provide images in non real-time.

In block 232, display system parameters are received. In some embodiments, display system parameters are received through a calibration process and stored on the system, or may be computed on the fly.

In block 234, the primary perceptual ghosting analysis process 104 uses the original image data and the display system parameters to determine the computing processes to apply to the images and the method for applying each computing process in a local and content-adaptive manner. In block 236, control masks are generated that include or represent the computing processes for ghosting suppression. In block 238, the ghosting suppression process 114 can modify the original image data with minimal changes to the image appearance. In block 240, the ghosting suppressed images are analyzed by the secondary perceptual ghosting analysis process 110. In block 242, control masks that include or represent the computing processes for ghosting cancellation are produced based on the analysis for local and content-adaptive ghosting cancellation. In block 244, ghosting cancellation is performed by the ghosting cancellation process using the control masks to produce modified images having maximum ghosting reduction with minimum alterations to the image data. In block 246, the modified images with reduced ghosting are outputted to a 3D display system for exhibition.

In some embodiments, the original stereoscopic images are modified by the ghosting cancellation process 116 instead of both the ghosting suppression process 114 and the ghosting cancellation process 116. In those embodiments, blocks 234, 236 and 238 can be skipped as shown by dotted line 248. For example, the secondary perceptual ghosting analysis process 110 can be applied to the input original images to estimate perceived ghosting and produce cancellation control masks 112 for local and content-adaptive ghosting cancellation.

In other embodiments, the original stereoscopic images are modified by the ghosting suppression process 114 instead of both the ghosting cancellation process 116 and the ghosting suppression process 114. In those embodiments, blocks 240, 242 and 244 can be skipped. The images modified by the ghosting suppression process 114 can be outputted in block 246.

Figure 3A:
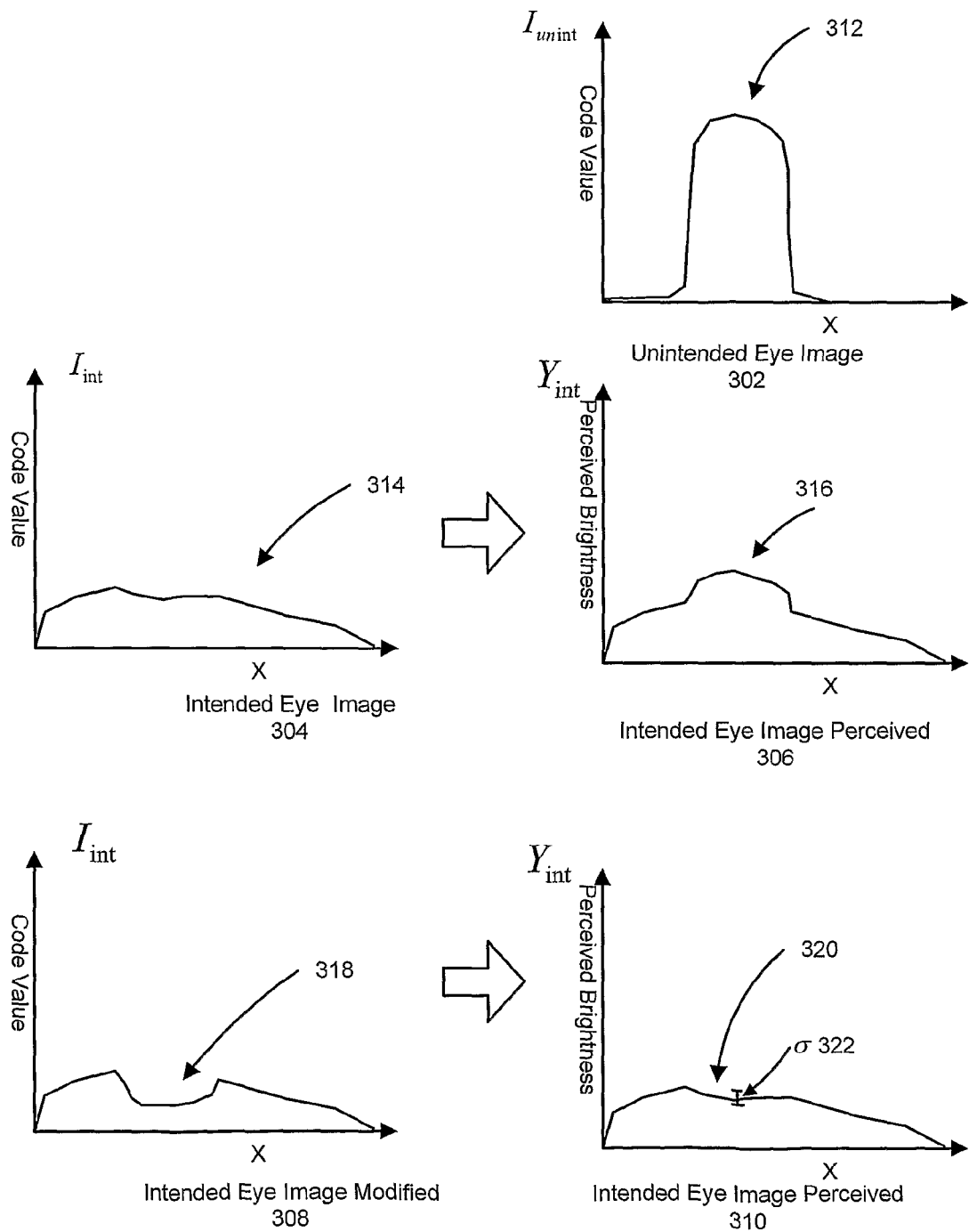
FIG. 3A shows charts illustrating a reduction in perceived ghosting through ghosting cancellation according to one embodiment of the present invention.

FIG. 3A illustrates concepts related to ghosting cancellation according to one embodiment of the present invention. As discussed previously, ghosting can be the result of leakage of information from one eye (the unintended eye) to another eye (the intended eye). Such leakage from the unintended eye images may be perceived in the intended eye as ghosting by a human viewer. In FIG. 3A, each sample image represents a single line of an otherwise two-dimensional image frame. Sample image 302 is an original image for the unintended eye and sample image 304 is an original image for the intended eye. The horizontal axis of each sample image represents pixel horizontal positions and the vertical axis represents pixel code values. The intended eye image 304 is a relative flat image with relatively low code values. The unintended eye sample image 302 includes a highlight peak 312 near the center of the line, which causes visible ghosting 316 in the perceived intended eye image 306 shown in perceived brightness. If the brightness level of the perceived ghosting does not exceed the original brightness level of the original intended eye sample image 304, code values 318 of the intended eye image 308 can be modified to result in modified image 310 that is perceived to be ghosting free or nearly ghosting free 320.

The human eye has a threshold level with respect to perceived ghosting. Such a level may be referred to as a non-perceptible ghosting threshold. Ghosting may not be perceivable to a human eye if its brightness level is under a non-perceptible threshold level. The non-perceptible ghosting threshold may be dependent on image content, which can be quantified using one or more psychovisual factors. In the modified image 310 that is a ghosting reduced sample image, the range of such non-perceptible ghosting threshold (represented by $\sigma$) is depicted as a small range 322 overlaid on top of perceived intended eye image. The scale of $\sigma$ 322 in the modified image 310 is exaggerated for the purpose of illustration. A non-perceptible threshold can be determines by experiments, such as an iterative approach for each psychovisual factor until a viewer does not see ghosting. In some embodiments, a non-perceptible threshold is determined for each psychovisual factor used. In other embodiments, a non-perceptible threshold is determined for all psychovisual factors used.

Figure 3B:
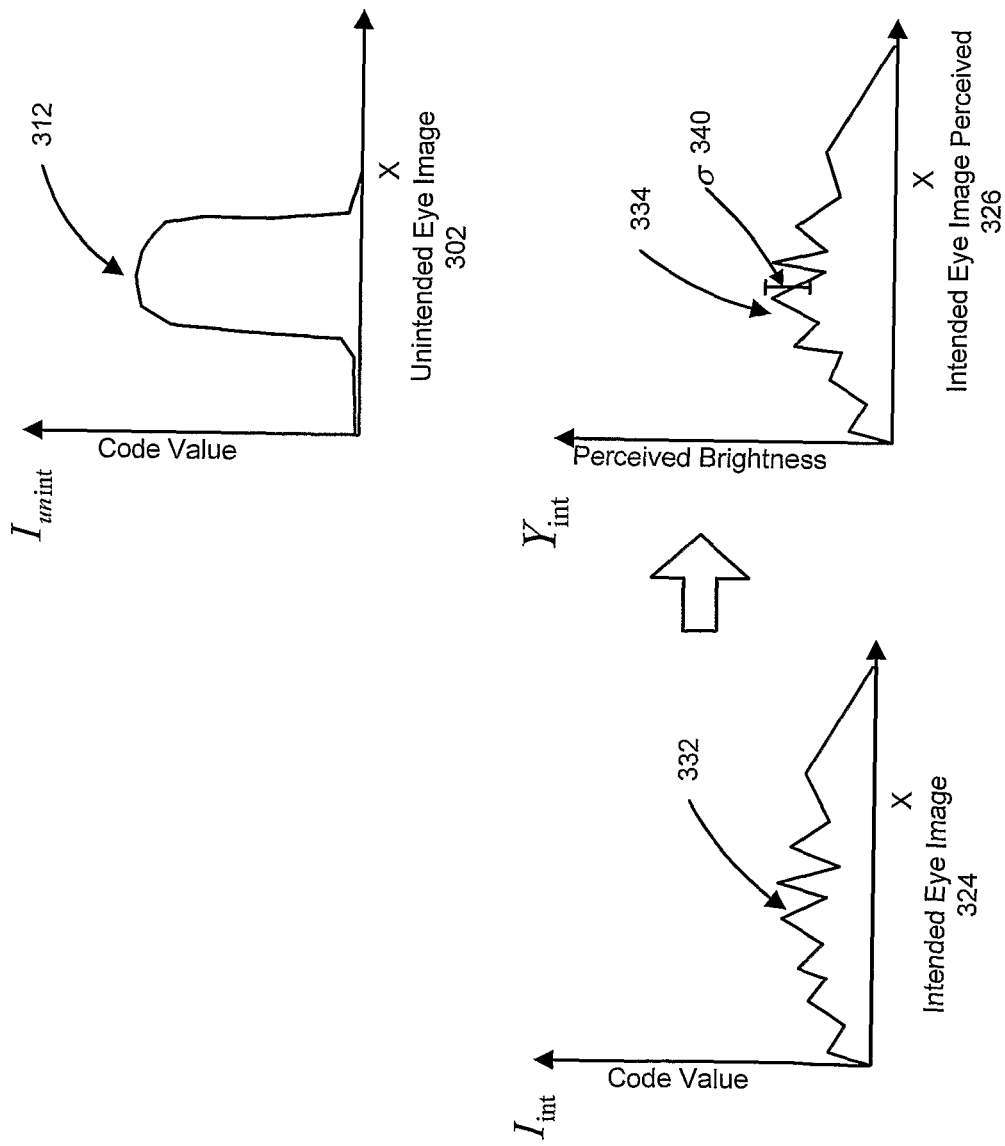
FIG. 3B shows charts illustrating a non-perceptible threshold range of perceived ghosting influenced by image content according to one embodiment of the present invention.

According to a certain psychovisual factors disclosed previously, the non-perceptible ghosting threshold may increase as image content changes. FIG. 3B shows another intended eye image 324 with a "heavy" or strong textured appearance. According to some psychovisual factors, a strong texture appearance may reduce the human eye's ability to detect the presence of ghosting. For example, strong image texture can increase the non-perceptible ghosting threshold. As a result, the perceived intended eye image 326 may appear to have much less ghosting in comparison with the sample image of 306 in FIG. 3A, although perceived intended eye images 326 and 306 may otherwise experience the same amount of physical leakage of information from the unintended eye sample image 302. In the sample image that is the perceived intended eye image 326, this phenomenon is described as the increase of the range of the non-perceptible ghosting threshold, σ, 340. The scale of σ 340 in the image of 326 is exaggerated for the purpose of illustration.

Figure 3C:
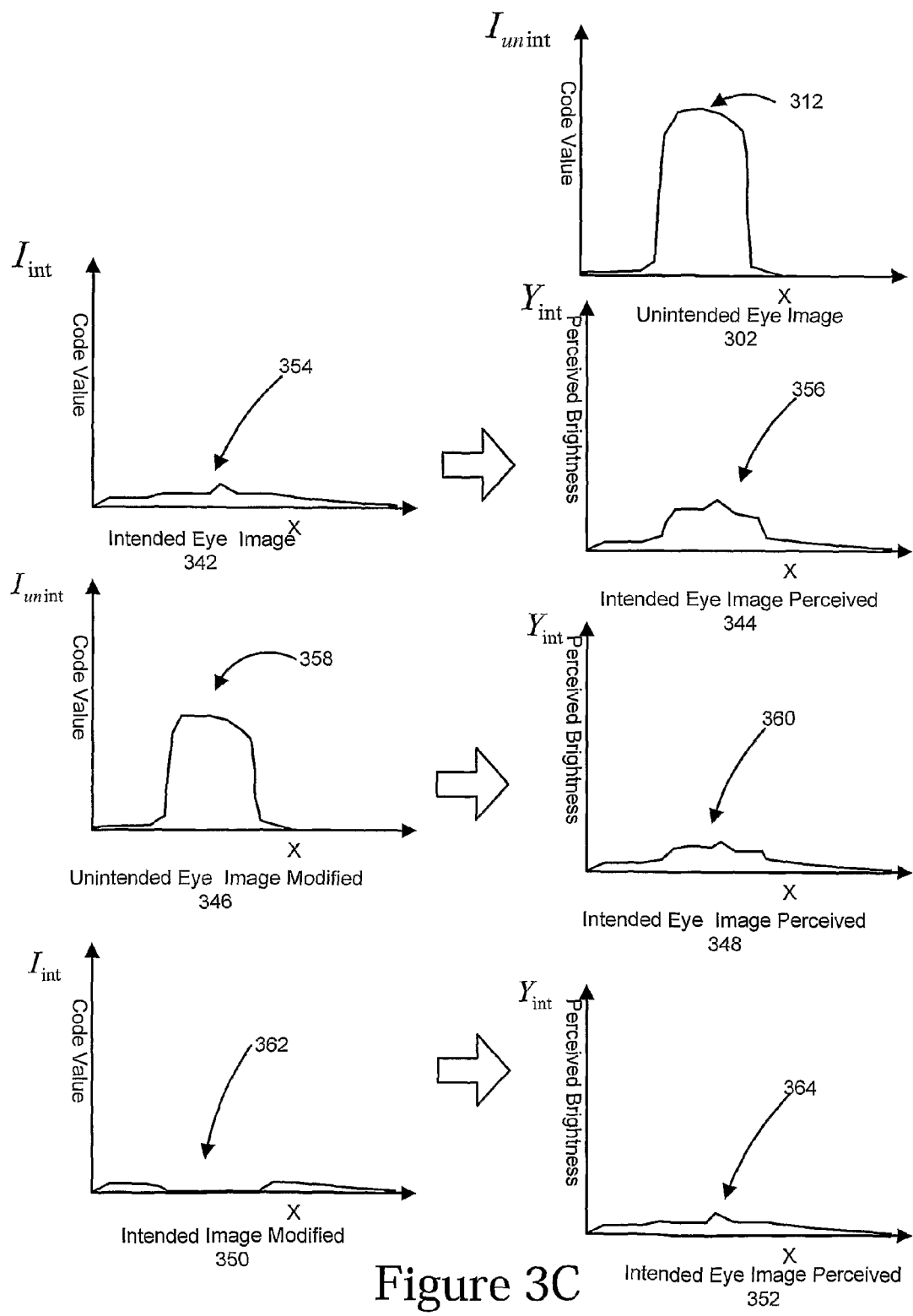
FIG. 3C shows charts illustrating a reduction of perceived ghosting through highlight reduction followed by cancellation according to one embodiment of the present invention.
Figure 3D:
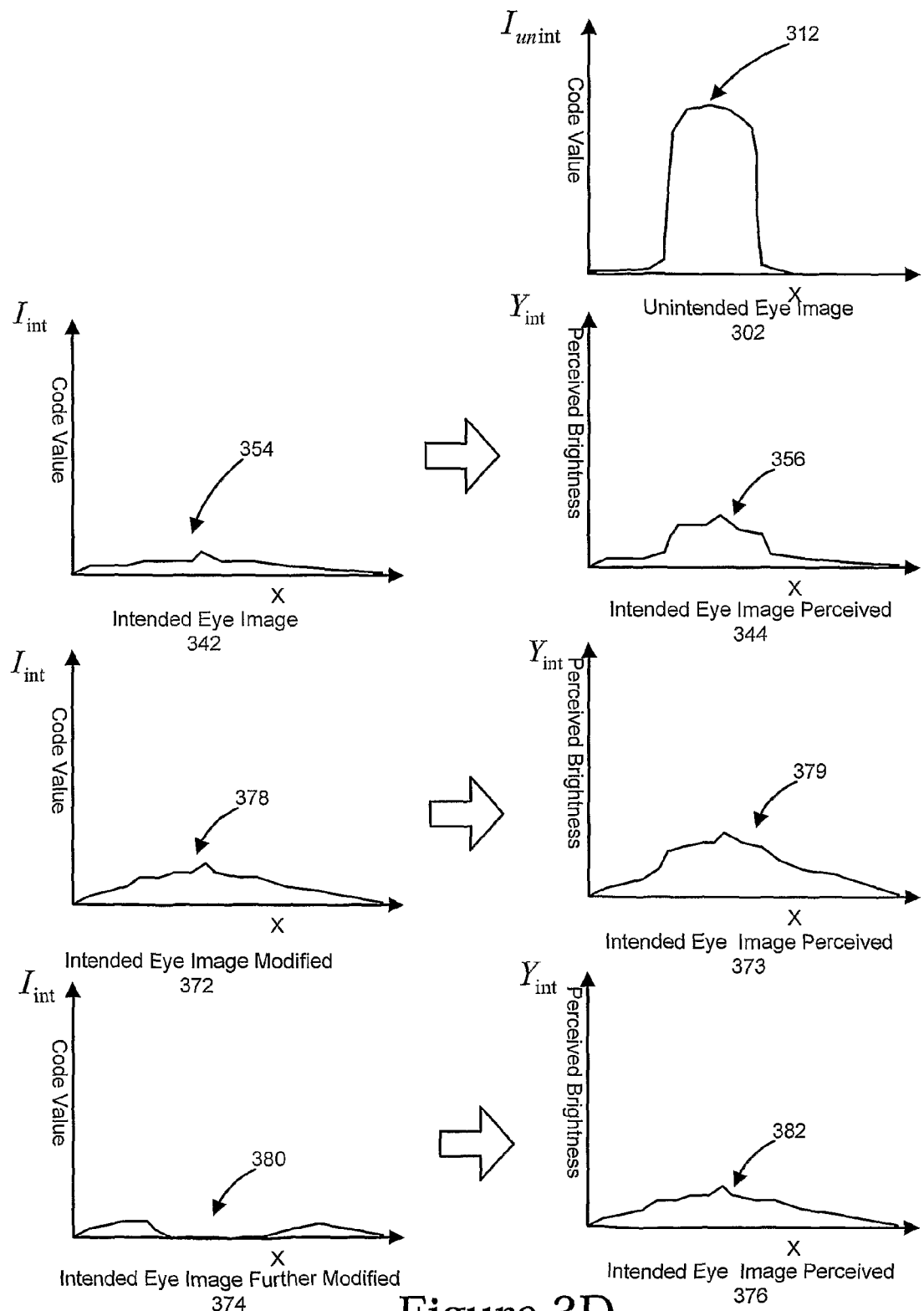
FIG. 3D shows charts illustrating a reduction of perceived ghosting through background boosting followed by cancellation according to one embodiment of the present invention.

FIGS. 3C and 3D illustrate concepts related to reducing perceived ghosting further by applying ghosting suppression with ghosting cancellation. In FIGS. 3C and 3D, the unintended eye sample image 302 is the same as in FIGS. 3A and 3B, but the intended eye image is replaced by a much darker image 342 with lower code values 354. The sample image 344 shows the perceived intended eye image with ghosting 356, which may not be completely eliminated by ghosting cancellation because the brightness level of ghosting exceeds the brightness level of the original intended eye image. One method illustrated in FIG. 3C is to modify the code values of the unintended eye image 346 to reduce the brightness level of its highlight region 358 to decrease the brightness level of the perceived ghosting 360. The resulting unintended eye image is a ghosting suppressed image 346 with the perceived ghosting in the intended eye image 348 reduced. If a sufficient amount of highlight is reduced in the ghosting suppressed image 346, the perceived ghosting can be reduced to a level 360 that eliminates ghosting by applying ghosting cancellation. The sample image 350 shows the result of applying ghosting cancellation to the intended eye image. The sample image 352 shows an almost ghosting-free intended eye image produced by a combined result of reducing the highlight region in the unintended eye image and applying ghosting cancellation to the intended eye image. Such a method of ghosting suppression by modifying the unintended eye image may be referred to as "highlight reduction".

An alternative method of ghosting suppression is illustrated in FIG. 3D. Such a method is referred to as "background boosting". Unlike the highlight reduction method that modifies the unintended eye image, the background boosting method can modify the intended eye image by raising its code values. In FIG. 3D, the darker image 342 that is an intended eye image is modified by raising the code values of the dark region 354 around the position of the perceived ghosting 356. The result is a modified intended eye image 372. If a sufficient amount of dark regions is raised 378, perceived ghosting can be removed by applying ghosting cancellation to the ghosting suppressed image of 372. The sample image 373 shows the perceived ghosting in the intended eye image with a raised background. The sample image 374 shows the result of applying ghosting cancellation to the modified intended eye image of 374. The resulting ghosting reduced intended eye image 376 is perceived as a ghosting free image with a raised background 382, which is brighter than the darker image 342, that is an original intended eye image, due to the raised background. If the raised intensity in the intended eye image 372 is small and gradual, the resulting difference in brightness between the modified intended eye image 376 and the original image 342 may not be perceivable.

Certain aspects and embodiments of the present invention allow the highlight reduction process and the background boosting process to work together to achieve more effective ghosting suppression and to reduce changes to the original image appearance. In one embodiment, a portion of perceived ghosting is reduced by reducing the highlight in local regions in an unintended eye image while the remaining portion of perceived ghosting is reduced by background boosting in local regions of an intended eye image. The coordination between these two methods can be controlled automatically or through direct user input 105 as shown in FIG. 1. Both the primary perceptual ghosting analysis process 104 and the ghosting suppression process 114 can support a computing structure that allows separate controls of the highlight reduction and the background boosting computing processes, as is further disclosed in FIG. 5 and FIG. 7 and disclosed below.

The contribution of ghosting suppression from both an unintended eye image and an intended eye image may result in splitting the amount of image appearance change between these two images, which may reduce overall perceived changes in image appearance. In one embodiment of the present invention, the implementation of the ghosting suppression process 114 allows a trade-off between the effectiveness of ghosting reduction and acceptable visual tolerance to the changes to image appearance. To further minimize changes to the image appearance, both the highlight reduction and the background boosting methods can be confined to local regions as determined by image content and psychovisual factors. Suppression control masks 108, which may be referred to as "highlight control masks" and/or "background control masks", are produced by the primary perceptual ghosting analysis process 104 to allow both methods to be local and content-adaptive.

Figure 4:
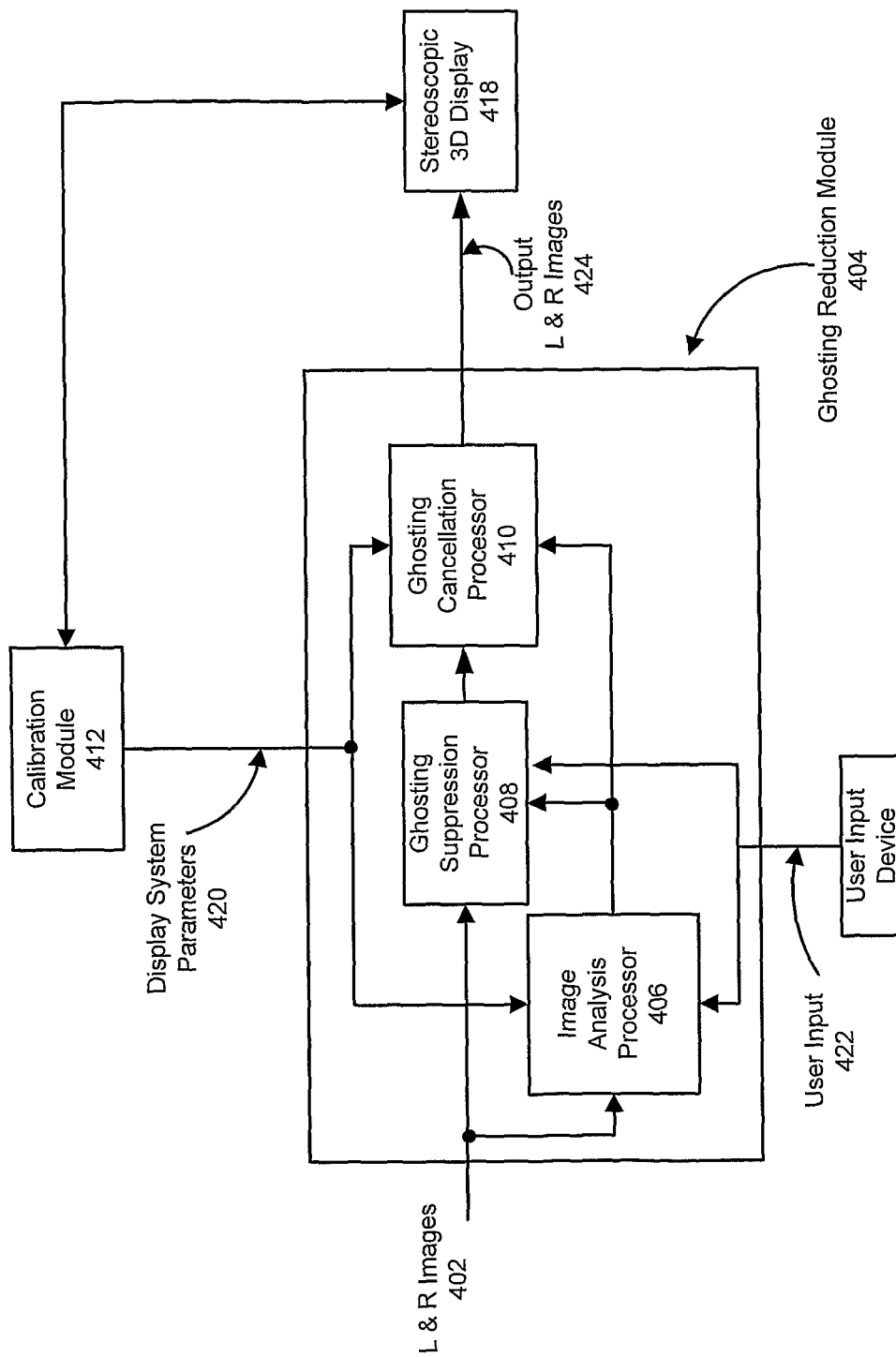
FIG. 4 is a process flow diagram for reducing perceived ghosting according to one embodiment of the present invention.

The ghosting reduction methods of FIG. 1 may be implemented using various system implements. FIG. 4 illustrates one such system according to one embodiment of the present invention. It includes a ghosting reduction module 404 that includes one or more processors such as an image analysis processor 406, a ghosting suppression processor 408 and a ghosting cancellation processor 410. In addition, a calibration module 412 may be provided to obtain display system parameters 420 that represent characteristics of a stereoscopic 3D display system 418 with respect to perceived ghosting.

The image analysis processor 406 may perform functions of the primary perceptual ghosting analysis process 104 and the secondary perceptual ghosting analysis process 110. The image analysis processor 406 can use the display system parameters 420 to analyze perceived ghosting in the input original stereoscopic images 402 and to calculate control masks, such as highlight control masks, background control masks and cancellation control masks. Both the highlight control masks and the background control masks can be used by the ghosting suppression processor 408 to perform local and content-adaptive ghosting suppression computing processes. The cancellation control masks can be used by the ghosting cancellation processor 410 to perform local and content-adaptive ghosting cancellation computing processes.

The integrity of the control masks can be maintained by the image analysis processor 406 to ensure the quality of the modified left eye images and right eye images 120 with reduced ghosting.

The system implementation of FIG. 4 provides a control mechanism for achieving a balance between effective ghosting reduction and minimizing alteration to image appearance. Such a control mechanism may be controlled by user input 422 to the ghosting reduction module 404 via a user input device 414. The digitally-processed ghosting-reduced image data 424 can be displayed by the 3D display system 418 to deliver ghosting reduced 3D images. However, a variety of implementations, such as modifications to FIG. 4, can be used to implement embodiments of the processing methods for different application environments such as real-time embedded hardware modules and/or offline processing in a post-production pipeline.

Figure 5:
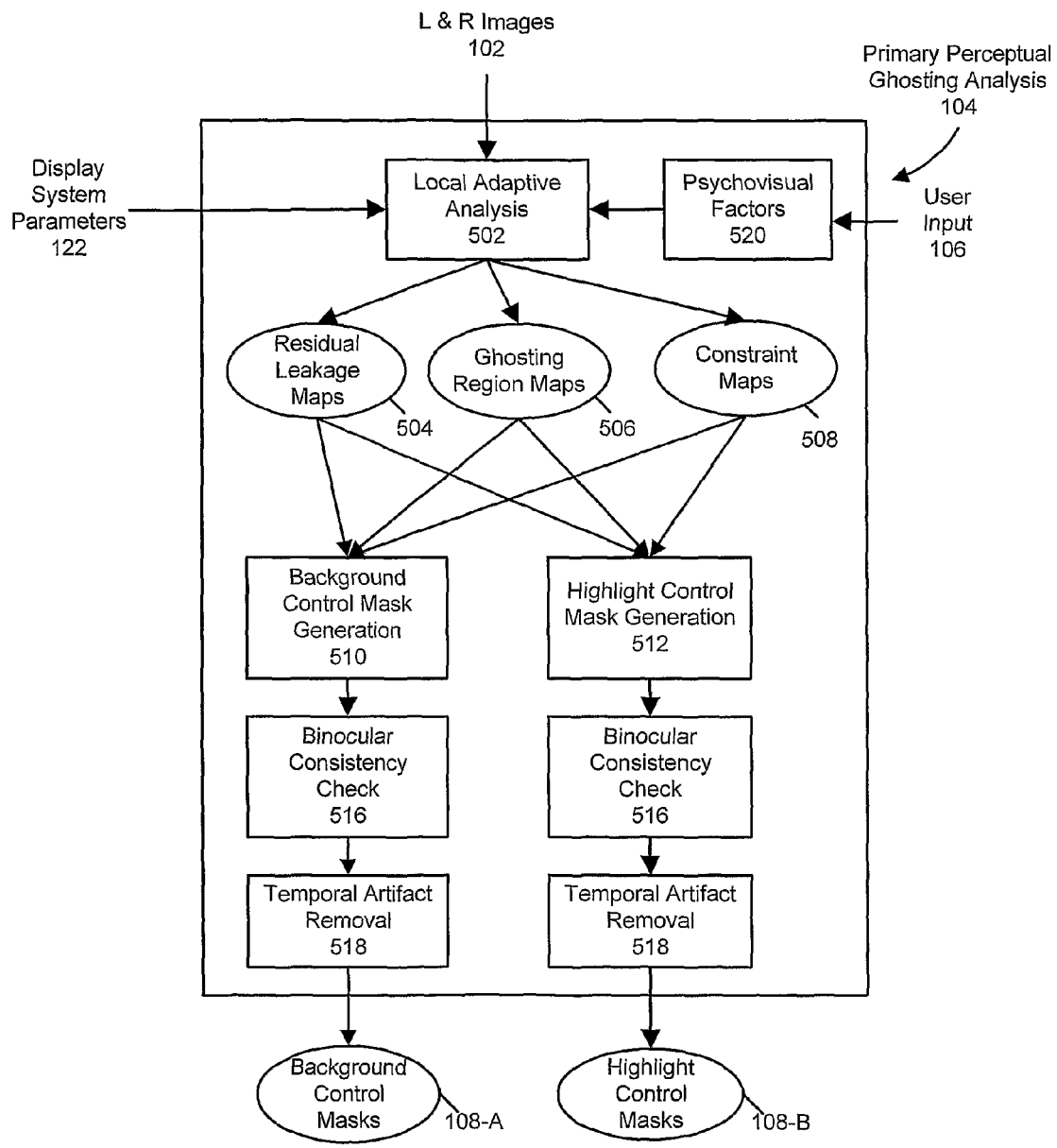
FIG. 5 is a process flow diagram of a primary perceptual ghosting analysis process module according to one embodiment of the present invention.

FIG. 5 shows the process flow detail of the primary perceptual ghosting analysis process 104 described in FIG. 1. One function of the primary perceptual ghosting analysis process 104 is to analyse image content of the original left eye images and right eye images 102 to determine if ghosting suppression computing is needed and, if needed, how ghosting suppression computing should be performed on the images. The primary perceptual ghosting analysis process 104 includes a local adaptive analysis module 502 that analyses the characteristics of each pixel of the left and right images and groups pixels that share a same characteristic into local regions. These local regions can be labeled by one or more dominant image characteristics. The local adaptive analysis module 502 can perform a set of image analysis and image processing algorithms ranging from simple image contrast calculation to sophisticated content-based algorithms. Examples of such algorithms include feature extraction, motion estimation, disparity estimation and texture analysis. Some of these algorithms may be applied in the spatial domain, and some others may be applied in the temporal domain or other domains.

The primary perceptual ghosting analysis process 104 can include a psychovisual factors module 520 that provides psychovisual factors as a set of applicable computation rules. These computation rules may establish a correspondence relating certain psychovisual factors to certain types of local regions. Examples of such local regions include, but are not limited to:

a region with high/low inter-image contrast;
a region with high/low brightness;
a highlight/background region;
a regions with large/small disparity;
a region with strong/flat texture;
a region with fast/slow motion; and
a region with strong/weak ghosting edge.

Each region can be labeled by its dominant characteristics, and each region can be weighted in appropriate control masks in a quantitative way based on the psychovisual factors applicable to the region.

The local adaptive analysis module 502 can receive the display system parameters 122 obtained through a separate calibration process or as default display system parameters. In some embodiments, the display system parameters 122 are obtained through the calibration process by measuring a certain system characteristics that induce perceived ghosting, such as the ghosting transfer functions between left and right channels. The display system parameters 122 obtained may represent the characteristics of a 3D display system with respect to perceived ghosting. The local adaptive analysis module 502 may also receive input 106, such as inputs that change the psychovisual factors and related computational rules. The user input 106 can be provided through a GUI using input devices, for example.

The local adaptive analysis module 502 may use ghosting transfer functions between the left eye channel and the right eye channel of a 3D display system to accurately determine where and how specific computing processes should be applied. The amount of perceived ghosting in a 3D display system may be dependent on crosstalk characteristics of a 3D display system as well as on the image intensity values. In addition, the amount of perceived ghosting may be influenced by local image characteristics based on psychovisual factors. $I_L$ and $I_R$ can represent, separately, the intensity values (or code values) of a left eye image and a right eye image. The system-dependent perceived ghosting from the left eye channel to the right eye channel can be modeled by a ghosting transfer function, represented as $T_{L \to R}(I_R, I_L)$. Similarly, the perceived ghosting from the right eye channel to the left eye channel can be modeled by a second ghosting transfer function, represented as $T_{R \to L}(I_L, I_R)$. In a more general representation, perceived ghosting can be represented by a ghosting transfer function such as $T_{un\ int \to int}(I_{int}, I_{un\ int})$ which models perceived crosstalk from the unintended eye (noted as "unint") image to the intended eye (noted as "int") image.

The ghosting transfer function $T_{un\ int \to int}(I_{int}, I_{un\ int})$ of a 3D display system can represent a relationship between $I_{un\ int}$ of an unintended eye image and the perceived ghosting in $I_{int}$ of the intended eye image. The image code values $I_{un\ int}$ and $I_{int}$ can be normalized to values in the range of 0 to 1, with "0" representing no ghosting and "1" a maximum perceived ghosting. The image code values may be mapped to the actual image code space, represented by [0, MAX], such that $$MAX = 2^n - 1 \tag{1}$$

where n is the bit depth of image data. For example, for an image with a 10-bit depth, MAX=1023. Ghosting transfer functions of a given 3D display system can be obtained through a calibration process that is described in more detail later. The ghosting transfer function of $T_{un\ int \to int}(I_{int}, I_{un\ int})$ may be a function of the intensity values from both the intended eye images and the intended eye images. However, the effect caused by intended eye image intensity values can be modeled separately in a psychovisual model, and the general ghosting transfer function can be simplified as an one-dimensional function such that $$T(I_{un\ int}) = T_{un\ int \to int}(0, I_{un\ int}) \tag{2}$$

where $I_{int}$ is defined to be 0. The ghosting transfer functions from the left eye channel to the right eye channel or from the right eye channel to the left eye channel can be simplified as:

$$\begin{cases} T_{L \to R}(I_L) = T_{L \to R}(0, I_L) \\ T_{R \to L}(I_R) = T_{R \to L}(0, I_R) \end{cases} \tag{3}$$

The ghosting transfer functions may describe the crosstalk from the unintended eye channel to the intended eye channel with respect to perceived ghosting, but may not describe the amount of ghosting as perceived by a human viewer. Human perception of ghosting can be affected by various content dependent psychovisual factors. Examples of such content dependent psychovisual factors are related to a certain types of image characteristics including, but not limited to, the inter-image contrast, background intensity, disparity, texture, and motion. The local adaptive analysis module 502 can search for local regions with any of these characteristics, analyse their effect on perceived ghosting and determine the amount of correction on top of the results computed based on ghosting transfer functions.

Referring again to FIG. 5, the local adaptive analysis module 502 can analyze image content and produce several types of intermediate data maps. Residual leakage maps 504 may be one type. Residual leakage maps 504 can be defined using the transfer functions in the following relationship:

$$\begin{cases} D_L(x, y) = \text{Max}(T_{R \to L}(I_R(x, y)) - I_L(x, y), 0) \\ D_R(x, y) = \text{Max}(T_{L \to R}(I_L(x, y)) - I_R(x, y), 0) \end{cases} \quad (4)$$

$D_L(x,y)$ and $D_R(x,y)$ are maximum residual leakage values for the left eye and the right eye at an pixel position (x,y), separately. The collection of maximum residual leakage values can constitute residual leakage maps, which define local regions in images where perceived ghosting cannot be completely eliminated by performing ghosting cancellation. The resulting residual leakage maps 504 can be used for generating control masks for ghosting suppression.

Another type of intermediate data maps are ghosting region maps 506 in which potential local regions with ghosting can be marked and assigned with weights. The weights can determine the strength on which ghosting suppression operations should apply. For example, a weight of "1" applied to a ghosting suppression operation can mean that 100% of residual ghosting is to be removed in a local region so that ghosting is unperceivable to human eye. A weight of 0.5 can mean that 50% of residual ghosting is to be removed.

The ghosting regions may be initially identified based on inter-image contrast between the left eye and the right eye images. The inter-image contrast at an image pixel position (x,y) may be the absolute difference in code values between a left eye image and a corresponding right eye image at the pixel location. This can be defined using the following relationship:

$$\delta(x,y) = |I_L(x,y) - I_R(x,y)| \quad (5)$$

where $I_L(x,y)$ and $I_R(x,y)$ are code values of the left and right images at pixel (x, y). The inter-image contrast values can be used to detect ghosting regions. A larger inter-image contrast value may indicate a stronger ghosting. Based on inter-image contrast values, appropriate weights can be assigned to pixels of a local region with ghosting, representing the estimated ghosting level of the region. The weights may be corrected using psychovisual factors that may be applicable to the ghosting region. The weights of ghosting regions can be further modified based on user inputs 106. The collection of final ghosting region weights may be ghosting region maps 506, which can be used for generating control masks for the ghosting suppression computing process.

As an example, the local adaptive analysis module 502 may make corrections to the weights of a ghosting region based on texture characteristic of the region. A standard texture analysis algorithm may be used to detect the texture complexity of a region, although other equivalent algorithms may also be applicable. In the algorithm, texture complexity may be quantified by computing the standard deviation of a local region, or by measuring the summation of local detail coefficients of a multi-resolution wavelet transform or wavelet package transform. A high texture complexity measurement value may indicate a heavy textured area, while a small value may indicate a relatively flat area. If a heavily textured region is detected, it may require less ghosting reduction processing since heavy texture reduces human sensitivity to ghosting, according to one aspect of psychovisual factors. The weights in the ghosting region maps may be reduced accordingly for the local region.

In another example, the local adaptive analysis module 502 may make corrections to the weights of a local region with ghosting based on motion characteristics of the region. A standard motion estimation algorithm may be used to measure the amount of motion in the region, although other equivalent algorithms may also be applicable. An example of such a method is described in U.S. Pat. No. 7,260,274. Motion may be quantified from motion vectors computed by a block based motion estimation algorithm or by an optical flow based motion estimation algorithm. Motion may also be quantified by measuring a temporal gradient for each pixel such as:

$$G_n(x,y) = |I_n(x,y) - I_{n-1}(x,y)|, \quad (6)$$

where $I_n(x,y)$ is the intensity value at the pixel location (x,y) in the nth image frame. If the motion vectors or the temporal gradient have large values in a region, such a region may be characterized as a fast motion region, and less ghosting reduction processing may be applied since fast motion reduces human perception of ghosting, according to another aspect of psychovisual factors. The weights in the ghosting region maps can be reduced accordingly for the local region.

In another example, the local adaptive analysis module 502 may make corrections to the weights of a ghosting region based on the intensity characteristics of the region. A region with high pixel intensity values may result in ghosting that is less perceivable to human eye than one with lower intensity values. Less ghosting reduction processing may be applied according to another aspect of psychovisual factors. The weights in the ghosting region maps can be reduced accordingly for the local region.

In another example, the local adaptive analysis module 502 may make corrections to the weights of a ghosting region based on stereoscopic disparity between the left eye and right eye images for the same region. A standard stereo matching algorithm may be used to measure the amount of disparity in a region, although other equivalent algorithms may also be applicable, such as those described in the following article: "A taxonomy and evaluation of dense two-frame stereo correspondence algorithms" by D. Scharstein and R. Szeliski, published in the *International Journal of Computer Vision* (Volume 47, Issue 1-3, 2002). A region with small disparity values may result in ghosting that is less perceivable to a human eye than one with large disparity values. Less ghosting reduction processing may be applied to the region according to another aspect of psychovisual factors. The weights in the ghosting region maps can be reduced accordingly for the local region.

In another example, the local adaptive analysis module 502 may make corrections to the weights of a ghosting region based the gradient of perceived ghosting occurred in the region. The gradient of ghosting may be quantified by detecting the gradient of a corresponding region in the unintended eye image that causes such a ghosting. A standard edge detection algorithm may be used with a local gradient detection algorithm. The local gradient may also be measured using the following relationship:

$$G(x,y) = (|I(x,y) - I(x-d,y)| + |I(x,y) - I(x,y-d)|)/2 \quad (7)$$

where $I(x,y)$ is the intensity value of the unintended eye image at the pixel location (x, y). The variable d is a targeted edge width. If a region has a sharp transition based on the spatial gradient $G(x,y)$ calculated by equation (7), the region can be identified as subjecting to sharp ghosting transition. More ghosting reduction processing may be applied, according to another aspect of psychovisual factors. The weights in the ghosting region maps may be increased accordingly for the local region.

For a region characterized with multiple psychovisual factors, the weight corrections determined based on individual psychovisual factors may be combined by a non-linear function.

Another type of intermediate data maps is constraint maps 508 in which constraints may be defined by a user or by the local adaptive analysis module 502. The constraint maps 508 can be used to manage computations of ghosting suppression. In one example, a user may input a command to block certain regions of the images from any ghosting suppression processing because changes to the image appearance in that portion of images are not acceptable. In another example, constraint maps 508 may contain a vector ht={$ht_{red}$,$ht_{green}$,$ht_{blue}$) that defines an upper limit for a highlight reduction amount in each color channel. In another example, a constraint maps may contain a vector bt={$bt_{red}$,$bt_{green}$,$bt_{blue}$) that defines an upper limit for a background boosting amount in each color channel. The constraint maps 508 can be used to regulate the generation of ghosting suppression control masks.

Figure 7:
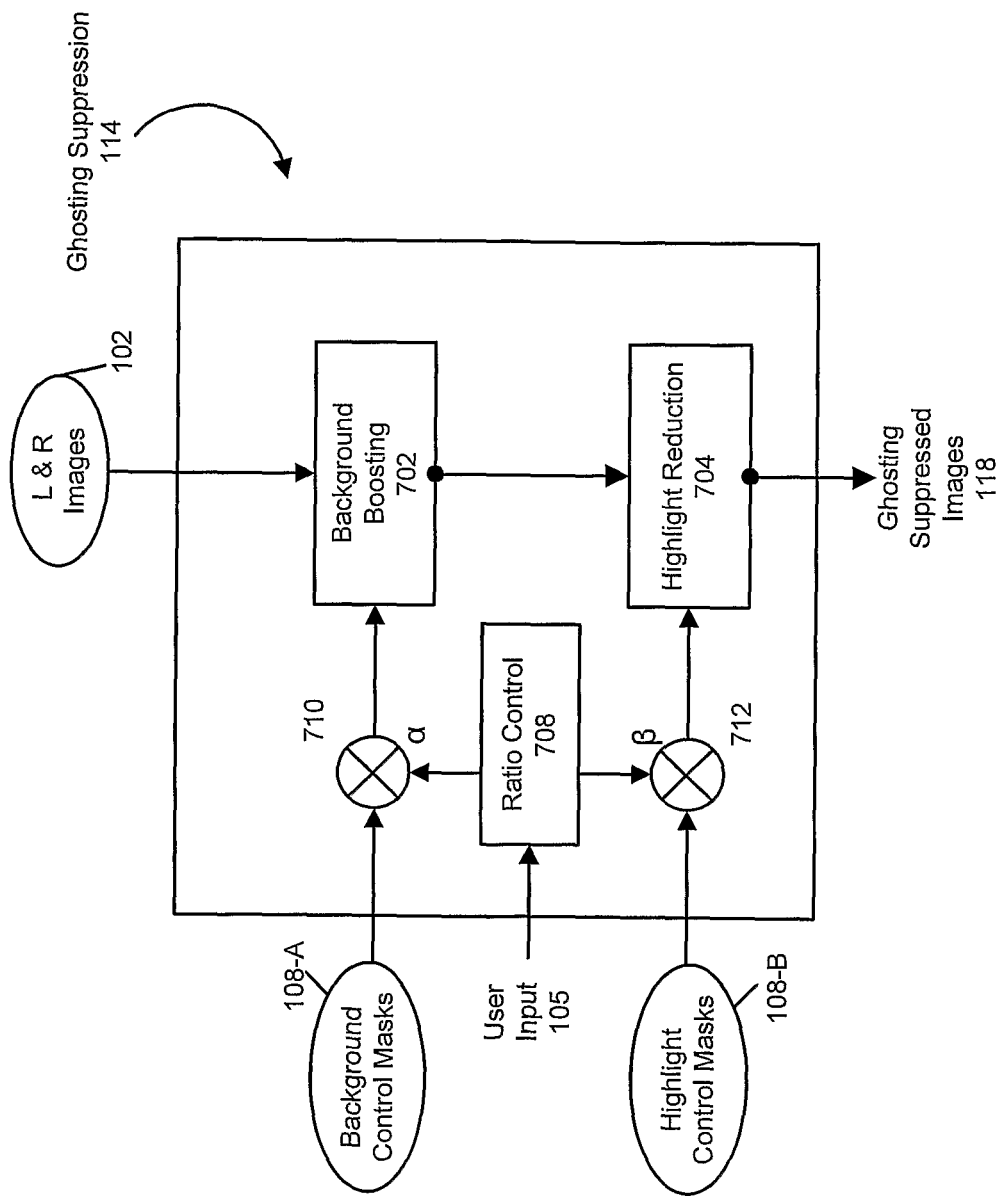
FIG. 7 is a process flow diagram of a ghosting suppression process module according to one embodiment of the present invention.

The ghosting suppression process 114 can include a background boosting module 702 and a highlight reduction module 704, as shown in FIG. 7. The background boosting module 702 can be controlled by background control masks 108-A, which can be produced by a background control mask generation module 510 using the residual leakage maps 504, the ghosting region maps 506 and the constraint maps 508. The active regions in a background control mask may define the dark regions in an intended eye image that are prone to ghosting from the unintended eye image (e.g. FIG. 3D). The background control masks may enable the background boosting module 702 to perform local and content-adaptive computing on the original left eye images and right eye images 102. To minimize the perception of raised brightness level in the intended eye image, the background control masks 108-A may have soft edges to blend the raised intensity level smoothly with surrounding dark regions.

Embodiments of the background control mask generation module 510 can be implemented as follows. For each intended eye image frame, an initial background control mask can be generated based on the values of the corresponding residual leakage maps 504. The initial background control mask can be weighted based on the ghosting region maps 506 of the same frame. The resulting control mask may be smoothed using a Gaussian kernel (or other low pass filters) to create soft edges. The spatial gradient of the soft edges may keep the spatial brightness change below a non-perceptible threshold by considering the psychovisual factor related to the spatial brightness change of the soft edges. The size of the Gaussian kernel can determine the soft edge of the background control masks and can be determined also by the size of the image frame as well as other image content characteristics. The resulting control masks may be regulated based on the constraints as defined by the constraint maps 508 of the same frame. This process can be repeated for each intended eye image frame. The background control mask generation module 510 can then switch to the second eye image and repeat the above computing tasks.

Similarly, a highlight control mask generation module 512 can produce highlight control masks 108-B that can control the computing process of the highlight reduction module 704 in the ghosting suppression process 114. The highlight control mask generation module 512 can produce initial highlight control masks using the residual leakage maps 504, the ghosting region maps 506 and the constraint maps 508. The active regions in a highlight control mask may define the high intensity regions in an unintended eye image that cause strong ghosting in a corresponding intended eye image (e.g. FIG. 3C). The highlight control masks 108-B may enable the highlight reduction module 704 to perform local and content-adaptive computing on the original left eye images and right eye images 102. To reduce potential artifacts due to reduction in intensity, the highlight control masks 108-B may have soft edges to blend the reduced intensity smoothly with surrounding regions.

Embodiments of the highlight control mask generation module 512 can be implemented as follows. For each unintended eye image frame, an initial highlight control mask can be generated based on the values of the residual leakage maps 504 of the same frame. The resulting control mask can be weighted based on the ghosting region maps 506 of the same frame. The resulting control mask can be smoothed by an appropriate Gaussian kernel (or other low pass filters) to create soft edges by considering the psychovisual factor related to the spatial brightness change of the soft edges. The resulting control masks can be regulated based on the constraints as defined by the constraint maps 508 of the same frame. This process can be repeated for every unintended eye image frame. Then the highlight control mask generation module 512 may switch to the second eye image and repeat the above computing tasks.

The control masks may be produced in pairs, one for the left eye image and one for the right eye image. Since a control mask is produced independently from the matching control mask in the pair, the active regions and weights of both control masks may not match precisely. This may cause binocular mismatch artifacts in the ghosting reduced images. A binocular consistency check module 516 can be used to correct such a mismatch between each pair of control masks. One example of binocular correction includes using a maximum operation to merge the two paring background control masks into one mask to be used for both the left eye and the right eye. The following relationship represents such an approach:

$$B = \max(a_L B_{Left}, a_R B_{Right}) \tag{8}$$

where $B_{left}$ and $B_{Right}$ are background control masks for the left eye and right eye separately. The correction factors $a_L \in [0,1]$, $a_R \in [0,1]$ may be adjustable parameters.

Both the background control masks 108-A and the highlight control masks 108-B may be frame-based. For example, a pair of control mask can be created for each pair of image frame. When viewed as a sequence, the control masks may exhibit temporal inconsistency artifacts. Such artifacts may result in undesirable temporal artifacts in the ghosting reduced images, if not corrected.

The temporal inconsistency artifacts in control masks can be corrected by a temporal artifact removal module 518. In one embodiment, temporal artifact removal is achieved through blending a control mask of the current frame with a smoothed control mask of the previous frame multiplied with a smooth factor, γ (0<γ<1), such that:

$$S'_i = \frac{S_i + \gamma S'_{i-1}}{1 + \gamma} \tag{9}$$

where, $S'_i$ is a smoothed control mask of frame i, and $S_i$ is a uncorrected control mask of frame i. The computing operation of equation (9) can be referred to as temporal smoothing, and can be controlled by the value of γ, subject to any limitation as defined by the constraint maps 508. The change from $S_i$ to $S'_i$ may be limited such that the absolute change between $S_i$ and $S'_i$ is kept under a certain limit. The temporal smoothing operation of (9) can be applied to any type of control masks. In one embodiment, a sequence of control masks corrected by a binocular consistency check module 516 are stored temporarily in a buffer device so that temporal smoothing can be applied. The temporally smoothed control masks may be final control masks, such as background control masks 108-A and highlight control masks 108-B, that can be used by the ghosting suppression process 114 that includes a background boosting module 702 and a highlight reduction module 704, as shown in FIG. 7.

In one embodiment of the present invention, the background boosting module 702 may work with the highlight reduction module 704 on the same stereoscopic image pair to achieve maximum reduction in perceived ghosting. In a region where the intensity values of the left eye image is smaller than those of the right eye image, the left eye image can be equated to the intended eye background so that background boosting can be applied to the region in the left eye image. At the same time, the same region in the right eye image can be equated to the unintended eye highlight so that highlight reduction can be applied in the right eye image.

The scales in a background boosting control mask may define the level of background boosting computing allowed in an active region of an intended eye image. For example, bt can represent the scale of a background control mask at a pixel position. When the scale bt=0.1, it can allow the intended eye image code value to be raised by 10% of the full intensity at the same pixel position. A zero scale value may prohibit any background boosting computing operation. Other definitions of the background control mask scales are also possible. Such scales are not limited to the above example. A background control mask with soft edges may include gradually reduced scales near the edge of an active region so that an intensity raised background region can blend seamlessly with the surrounding pixels.

Similarly, the scales of a highlight control mask may define the level of highlight reduction computing allowed in an active region of an unintended eye image. For example, the scale of a highlight control mask at a pixel position can be represented by ht. If ht=0.1, it can allow a pixel in the unintended eye image to reduce its intensity by 10% of the full pixel intensity. A zero scale may prohibit any highlight reduction computing operation. Other definitions of the highlight control mask scales are also possible. Such scales are not limited to the above example. A highlight control mask with soft edges may have gradually reduced scales near the edge of an active region so that an intensity reduced highlight region can blend seamlessly with the surrounding pixels.

Referring again to FIG. 7, the ghosting suppression computing process 114 can provide a control mechanism to coordinate the joint operations of the background boosting module 702 and the highlight reduction module 704. The control mechanism may include a ratio control module 708 that can be adjusted through user input 105. The ratio control module 708 may generate a pair of ratios $\alpha$ and $\beta$, which may be multipliers to corresponding control masks. The control of the background boosting operation may be by ratio $\alpha$ through a multiplier 710, while the control of the highlight reduction operation may be by ratio $\beta$ through another multiplier 712. Different modes of ghosting suppression computing operations can be selected by adjusting these two ratios. For example, if ratio $\alpha$ is set to 100% and $\beta$ to zero, the background boosting operation is selected for ghosting suppression instead of the highlight reduction operation. On the other hand, if ratio $\beta$ is set to 100% and $\alpha$ to zero, the highlight reduction operation is chosen instead of the background boosting operation. If both $\alpha>0$ and $\beta>0$, the ghosting suppression may be performed jointly by background boosting and highlight reduction modules as weighted by the values of these two ratios. In the case that $0<\alpha<100\%$ and $0<\beta<100\%$, ghosting suppression can be achieved partially by raising the intensity of the intended eye image and partially by reducing the highlight of the unintended eye image. Full ghosting suppression may be achieved when $\alpha+\beta=100\%$. Where $\alpha=\beta=50\%$, ghosting suppression may be equally split between background boosting and highlight reduction. The control mechanism of FIG. 7 may also allow the ratio control module 708 to be controlled automatically based on image content.

Certain embodiments of ghosting suppression processes can be applied to more than one color channel. When each color channel is processed independently, certain types of false color artifacts may be produced due to unbalanced pixel intensity changes to each color channel. Color consistency can be maintained by processing in the hue, saturation, and value (HSV) color space instead of the RGB color space. A ghosting suppression operation may be performed on the V channel and not on the H or S channels in order to maintain color consistency. In other embodiments, the operation can be performed on the V and S channels while keeping H channel untouched. The use of smoothed control masks may prevent visible contour artifacts from appearing because of local intensity changes.

Figure 6:
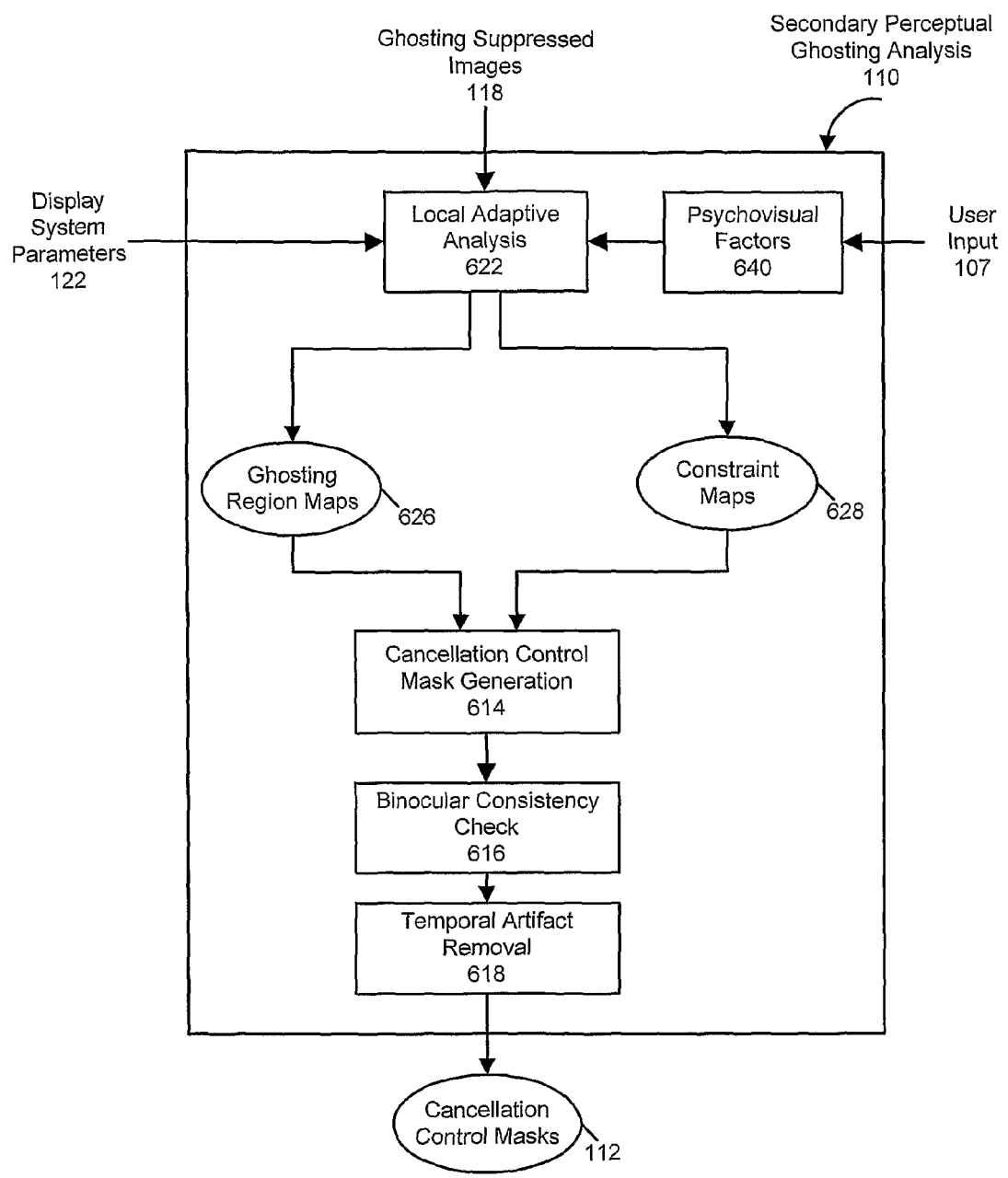
FIG. 6 is a process flow diagram of a secondary perceptual ghosting analysis process module according to one embodiment of the present invention.

Referring again to FIG. 1, the image data modified by the ghosting suppression process 114 may be processed further by the ghosting cancellation process 116. The ghosting cancellation process 116 may reduce or even eliminate perceived ghosting by modifying the intended eye images. The ghosting cancellation process 116 can be performed in a local and content-adaptive way as guided by cancellation control masks 112 to achieve effective ghosting reduction while minimizing changes to the image data. The cancellation control masks 112 can be generated by the secondary perceptual ghosting analysis process 110. FIG. 6 shows one example of a process flow of the secondary perceptual ghosting analysis process 110, which is similar to the primary perceptual ghosting analysis process example shown in FIG. 5.

In FIG. 6, the image data that has been modified by ghosting suppression can be analyzed again by a local adaptive analysis module 622 because, for example, perceived ghosting may change after the modification. The local adaptive analysis module 622 can produce intermediate data maps, such as ghosting region maps 626 and constraint maps 628. The ghosting region maps 626 may be computed based on the display system parameters 122 and may be corrected by considering psychovisual factors provided by module 640. The constraint maps 628 can include constraint decisions that may be defined by a user 107 or by the local adaptive analysis module 622 and that may regulate the generation of ghosting cancellation control masks 112.

In some embodiments, the computational steps for generating the ghosting region maps 626 and constraint maps 628 may be the same as those described for FIG. 5. One potential difference may be that the ghosting cancellation operations may not use residual ghosting maps. The ghosting region maps 626 and constraint maps 628 may be used to generate cancellation control masks 112 by a cancellation control mask generation module 614. The resulting control masks may be further refined to remove binocular mismatch artifacts by a binocular consistency check module 616 and to remove temporal artifacts by a temporal artifact removal module 618.

The functions of these two artifact correction modules may be the same as those described with respect to FIG. 5. The secondary perceptual ghosting analysis process 110 may perform a subset of functions of the primary perceptual ghosting analysis process.

In one embodiment, the secondary perceptual ghosting analysis process 110 may include the same configurations as for the primary perceptual ghosting analysis process 104, except that certain unused functions may be disabled. For example, both processes can be performed by the same image analysis processor 406 described in FIG. 4.

The cancellation control masks 112 generated from the secondary perceptual ghosting analysis process 110 may be used to control how ghosting cancellation is applied to local regions of intended eye images. For example, a scale value of "1" may allow full cancellation, while a scale value of "0" may prohibit any cancellation. A scale value between "0" and "1" may imply partial cancellation. The cancellation control masks 112 may or may not use soft edges.

Figure 13:
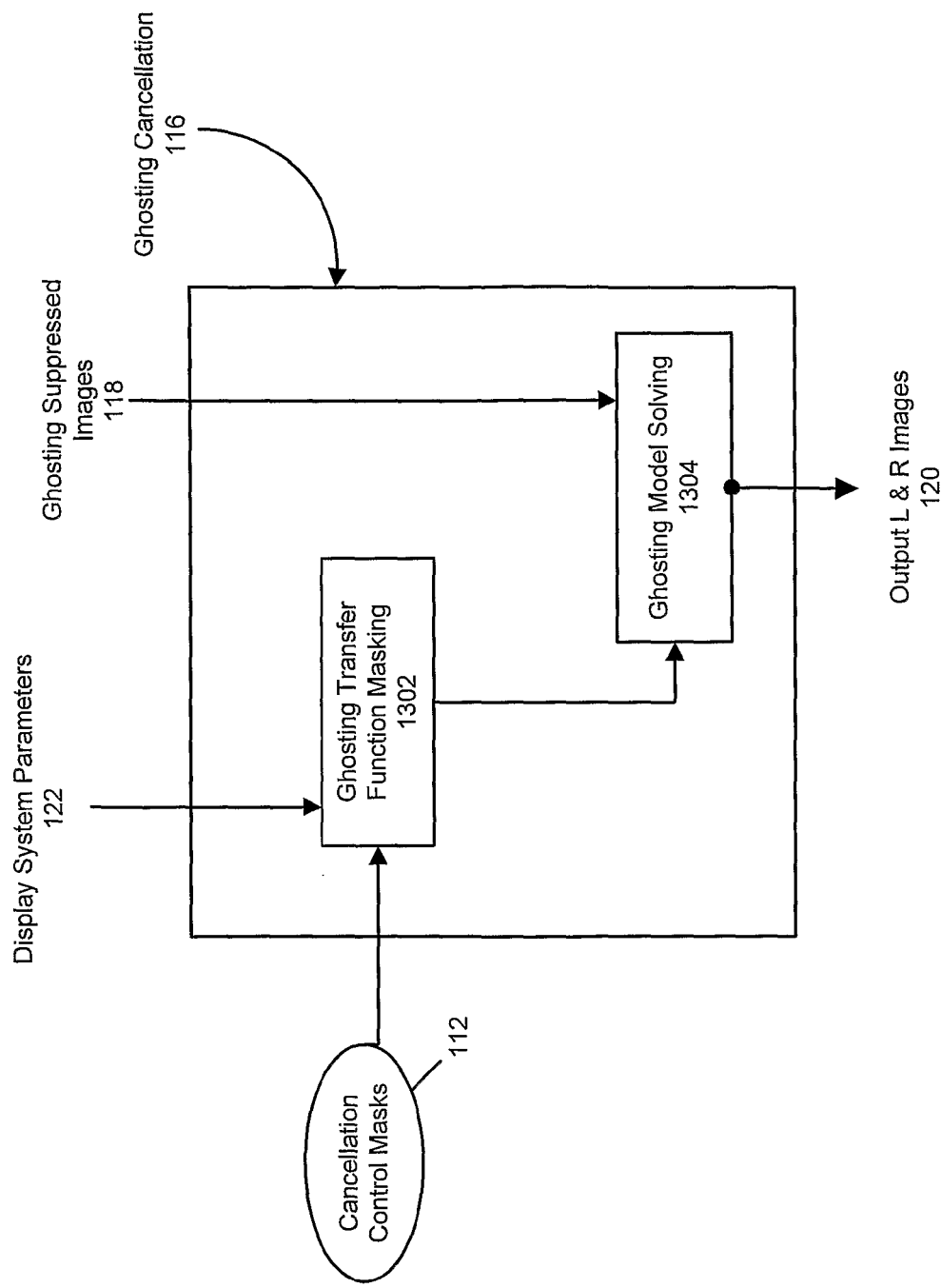
FIG. 13 is a process flow diagram of a ghosting cancellation process module according to one embodiment of the present invention.

One embodiment of the ghosting cancellation process 116 is illustrated in FIG. 13. The display system parameters 122 may be represented by ghosting transfer functions $T_{L \to R}(I_R, I_L)$ and $T_{R \to L}(I_L, I_R)$, which can be obtained through a calibration process. The ghosting transfer functions may be modified by the cancellation control masks 112 to create a customized ghosting transfer function for each image frame. This computational step is shown as a ghosting transfer function masking module 1302 in FIG. 13. The masked ghosting transfer functions can be used to build a perceived ghosting model for each image frame. Since the control masks are local and content-adaptive, the resulting ghosting models may be local and content-adaptive. A ghosting cancellation process may be more effective when more accurate perceived ghosting models are computed.

Some embodiments of the present invention allow a perceived ghosting model to become more accurate by using certain human psychovisual factors. The visual sensitivity of human eyes has an inverse relationship with respect to image brightness, both in spatial and in temporal domain. The human eye is less capable of discern subtle intensity changes in a very bright image than he is capable in a darker image. Human perception of ghosting in a 3D display system follows a similar non-linear relationship. Such a relationship can be described by a general ghosting model such as:

$$I' = I + MT(\epsilon - I)^n \quad (10)$$

where I is the intensity of a ghosting-free image of the intended eye, T is a ghosting transfer function of a display system, and I' is the intensity of perceived image of the intended eye. M is a control mask representing human psychovisual properties with respect to perceived ghosting and is content dependent, and $\epsilon, n$ are modeling parameters. $MT(\epsilon-I)^n$ represents perceived ghosting. The variables, I', I, M, and T, can be normalized to a range of [0, 1]. When $I' \geq MT\epsilon^n$, the relationship may have a close-form solution depending on the value of parameter n. Equation (10) can provide a good approximation to the measured data from an IMAX® 3D cinema system when the modeling parameters are selected as $$n = 1/T \text{ and } \epsilon = 1. \quad (11)$$

However, other types of 3D display systems can also be modeled using Equation (10) by choosing appropriate n and $\epsilon$ values.

Some embodiments of the present invention allow ghosting suppression to be performed by solving a content-adaptive perceived ghosting model generated using Equation (10). Computation steps can be represented by a ghosting model solving module 1304 in FIG. 13. In building such a perceived ghosting model, the image I in Equation (10) can be treated as a modified image by ghosting cancellation and the image I' can be treated as an original image. The term MT can be replaced by frame-based content-adaptive masked ghosting transfer functions computed by ghosting transfer function masking module 1302. By further replacing the parameters with those defined in Equations (11), the following perceived ghosting model can be established for both the left eye and the right eye images:

$$\begin{cases} I'_L = I_L + M_L T_{R \to L}(I_R)(1 - I_L)^{\frac{1}{T_{R \to L}(I_R)}} \\ I'_R = I_R + M_R T_{L \to R}(I_L)(1 - I_R)^{\frac{1}{T_{L \to R}(I_L)}} \end{cases} \quad (12)$$

The amount of modifications to the left eye and right eye image code values can be determined by solving $I_L$ and $I_R$ from Equations (12). Solving Equation (12) for each pixel in each local region with ghosting of each image frame may be the computing process for the ghosting model solving module 1304 in FIG. 13. In some embodiments, the above computing process can be also repeated for all color channels. The perceived ghosting model of Equation (12) may allow the influence by content-dependent psychovisual factors to be separated from the influence by content-independent psychovisual factors, and may allow the influence by system-dependent factors to be separated from the influence by system-independent human psychovisual factors. Such separations can allow each type of these factors to be modeled separately, so that the disclosed ghosting cancellation method based on solving Equation (12) can be applicable for many, if not all, types of 3D display systems.

In other embodiments, the display system parameters vary at different screen locations and also from different viewer seating locations. The display system parameters at a screen location (x,y) and from a seating position k can be expressed as a ghosting transfer function of $T_{k,(x,y)}(I)$. A collection of ghosting transfer functions for two or more screen positions from a given viewing position can form a ghosting transfer function profile $P_k$, expressed as $P_k = T_{k,(x,y)}(I)$. A calibration process can be used to identify at least one profile of the 3D display system. If a single profile is used, it can be represented as $P = T_{(x,y)}(I)$. A ghosting transfer function profile may be defined for each color channel in each eye.

Figure 8:
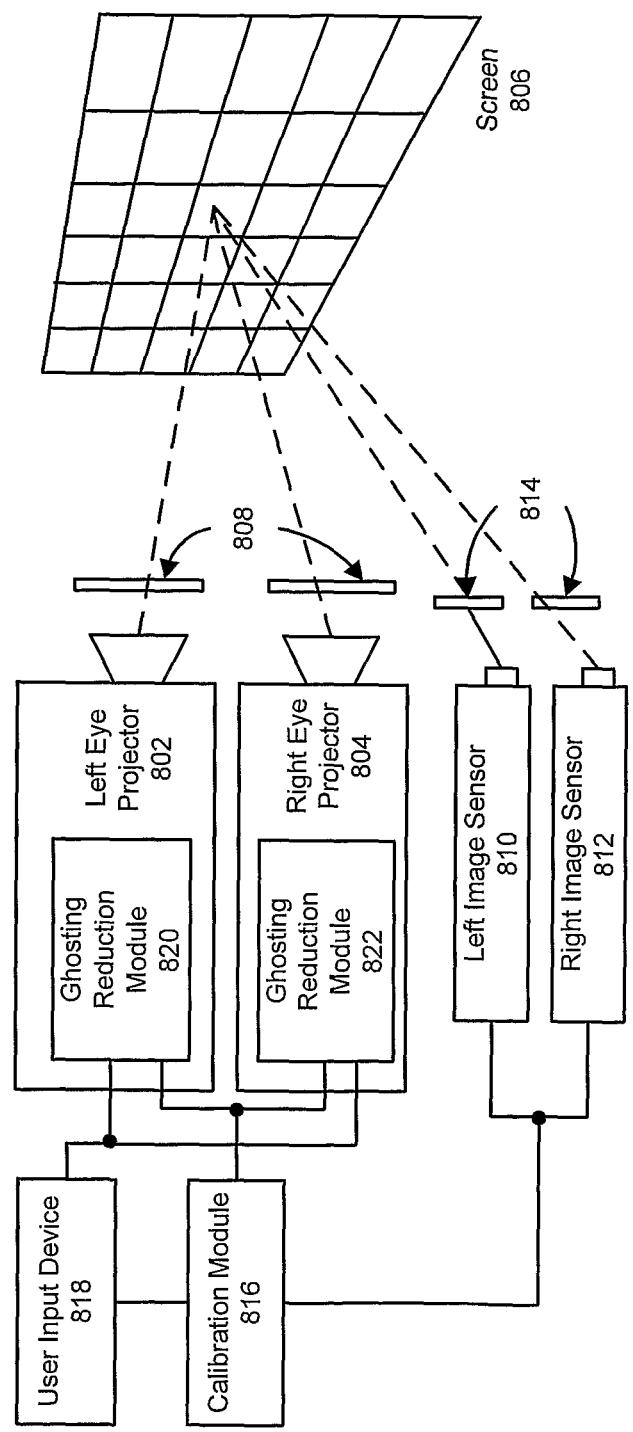
FIG. 8 shows a 3D image display system with a calibration module and a real-time ghosting reduction module according to one embodiment of the present invention.

The ghosting transfer functions in some embodiments can be obtained using a calibration module, such as calibration module 412 in FIG. 4. To measure perceived ghosting, a calibration module 412 may display a set of pre-defined test pattern images and perform certain measurements. FIG. 8 shows a 3D display system equipped with a calibration module 816 according to one embodiment of the present invention. The 3D display system is a dual-projector system that includes a left eye projector 802, a right eye projector 804, and a screen 806 for displaying projected 3D images. The left eye projector 802 can display a left eye test pattern image sequence, and the right eye projector 804 can display a right eye test pattern image sequence. Linear or circular polarizers 808 can be used to polarize the left eye images and the right images in an opposite manner such that the left eye images and right eye images are directed to the appropriate eyes of a viewer wearing appropriate polarizer glasses. The viewer may perform a series of manual calibration procedures based on visual matching of displayed images. The calibration module 816 can control the display of test pattern images, receive the user measurements and compute display system parameters. The left eye test pattern images can be spatially aligned with the right eye test pattern images.

The projected left eye and right eye test pattern images may also be detected by using a pair of image sensors equipped with appropriate polarizers 814 so that the left eye images are detected by the left image sensor 810 and the right eye images are detected by the right image sensor 812. The images captured by the image sensors can be stored in the calibration module 816 and used for computing the display system parameters of the 3D display system in an automated manner. The obtained display system parameters 122 can be stored in ghosting reduction modules 820, 822 embedded in each projector. Each of ghosting reduction modules 820, 822 may perform real-time ghosting reduction computations on received 3D images. The ghosting-reduced 3D images can be displayed by the projectors 802, 804 in real-time. A user input device 818 may allow a user to interact with the calibration process, for example when human eyes are used for matching test pattern images instead of using image sensors.

FIG. 8 illustrates one embodiment for illustrative purposes. Various ghosting reduction and elimination processes according to various embodiments of the present invention can be implemented on other types of 3D display systems having different calibration module configurations, for example. In some embodiments, the calibration module 816 may be a device that is separate from the 3D display system. In other embodiments, the calibration module 816 can be an embedded component of the 3D display system.

Figure 9:
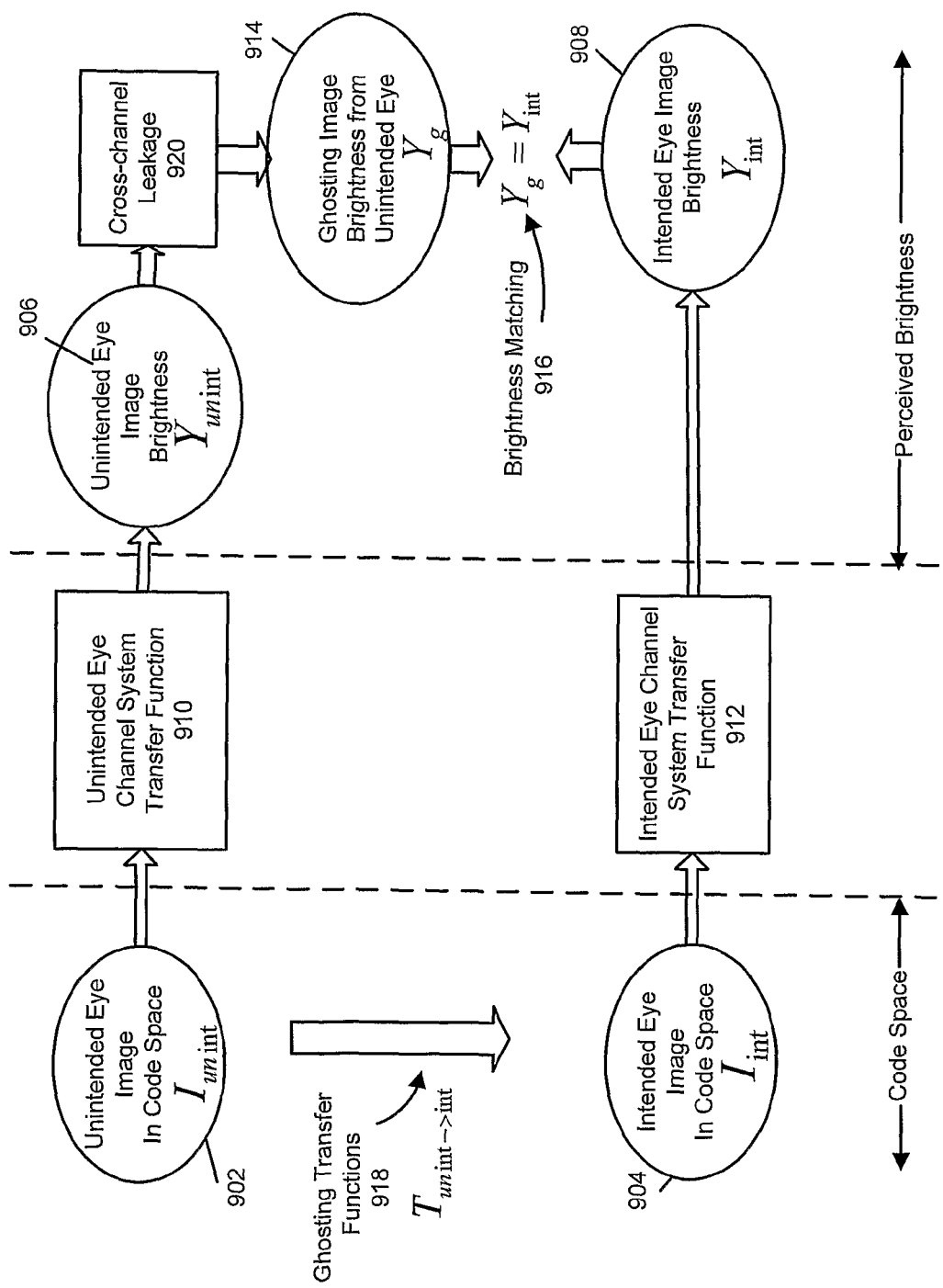
FIG. 9 is a process flow diagram for measuring ghosting transfer function in code space according to one embodiment of the present invention.

FIG. 9 shows a calibration process according to one embodiment of the present invention. The left eye channel can be the unintended eye channel that causes ghosting in the right eye channel, which may be the intended eye channel. The test pattern image 902 may be an unintended eye image with an intensity of $I_{un\ int}$ in code space. The test pattern image 902 may be displayed through the left eye projector, which can be modeled by an unintended eye channel system transfer function 910. The leakage from the left eye channel to the right eye channel can be modeled by cross-channel leakage 920. The displayed left eye image may be an unintended eye image 906 with a brightness $Y_{un\ int}$, which can produce ghosting 914 with a brightness level $Y_g$ over the displayed intended eye image. The intended eye image can be a right eye test pattern image 904 with an intensity of $I_{int}$. The intended eye image can be displayed by a right eye projector 912, which can be modeled by an intended eye channel system transfer function 912. The displayed right eye image can be an intended eye image 908 with a brightness $Y_{int}$.

The system transfer function of an unintended eye channel 910 or an intended eye channel 912 can be determined by numerous display system parameters 914 of the 3D display system. Examples of such display system parameters 914 include display optics, display gamma, image encoder, screen characteristics, viewing geometry, and glasses performance. The process for measuring these display system parameters may be complex and time-consuming. In some cases, high precision equipment may be needed to measure certain system parameters, the costs and availability of which may be prohibitive.

Figure 10:
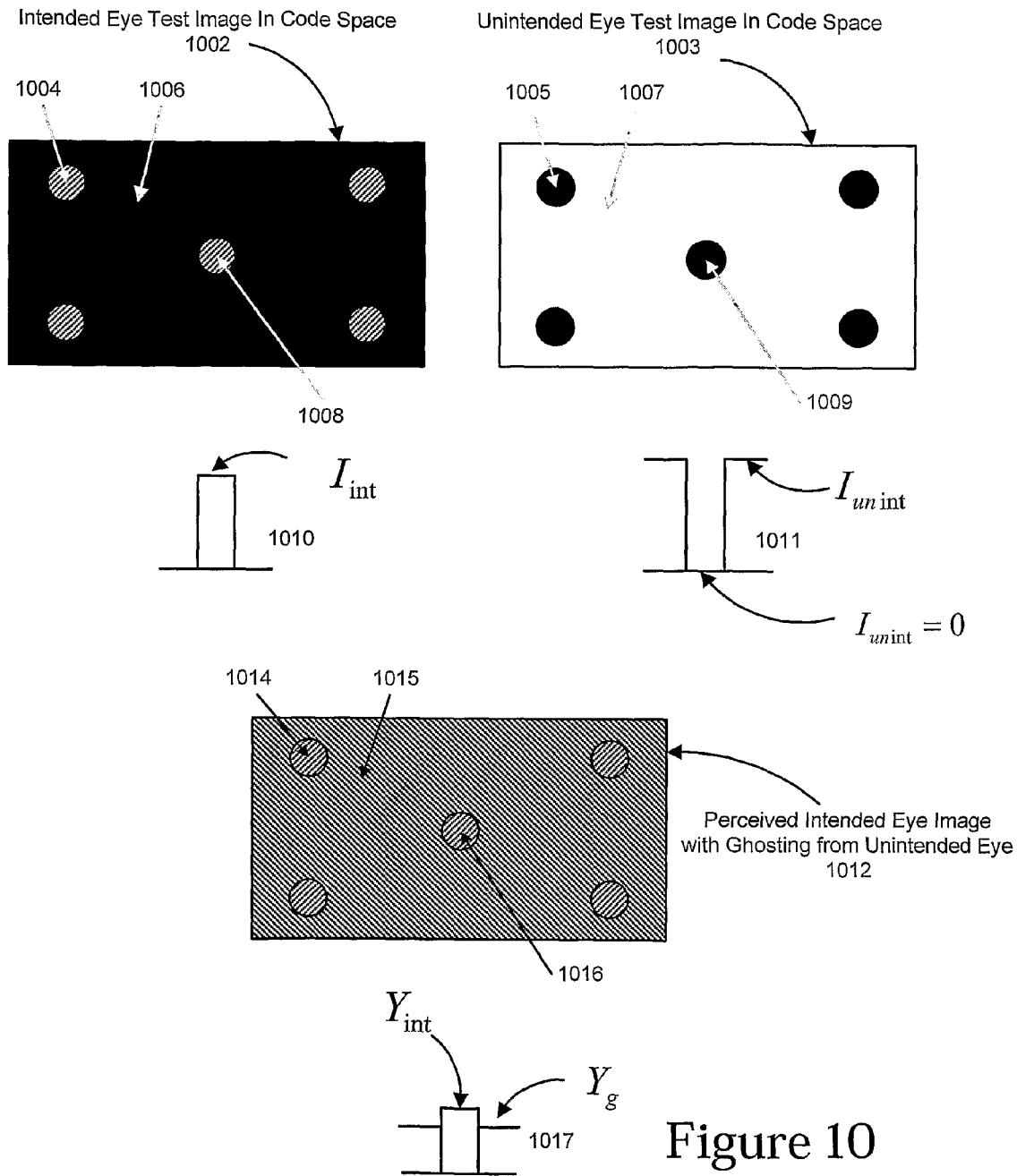
FIG. 10 illustrates test images used for calibration according to one embodiment of the present invention.

Some embodiments of the present invention measure perceived ghosting in code space. The intensity value $I_{int}$ of the right eye test pattern image 904 can be adjusted to result in image brightness $Y_{int}$ matching the brightness of ghosting $Y_g$ in the intended eye. The test patterns can be designed to keep corresponding regions of the unintended eye image at zero intensity when the intended eye image is adjusted. FIG. 10 illustrates example test patterns according to one embodiment of the present invention. Measuring perceived ghosting in code space may avoid unnecessary assumptions and conversions that might be erroneous. Matching the brightness of $Y_{int}$ and $Y_g$ (916) can be performed by human eye or by a pair of image sensors, which can be simple and cost effective. Accordingly, use of high precision equipment may be avoided. If the adjusted intended eye image in code space produces a brightness that matches the brightness of ghosting at a specified display position, correspondence between the two eyes can be established at the display position, which may be used to compute a ghosting transfer function $T_{un\ int \to int}$ 918 defined in code space.

A ghosting transfer function profile represents the distribution of ghosting transfer functions across a display surface, such as the screen 806 in FIG. 8. A typical ghosting transfer function profile is a continuous function over a two dimensional grid. Each vortex of the grid corresponds to a single pixel position or a group of pixel positions of the display image space. A ghosting transfer function is a function assigned to a specific vortex, which is obtained either from direct measurements at the vortex position, or from the interpolation of ghosting transfer functions measured at nearby vortex positions. Since ghosting transfer functions are color dependent, each color channel includes a separate ghosting transfer function profile.

Measuring ghosting transfer function profiles can be performed by a calibration module 412 (or 816 in FIG. 8). The measurement of a ghosting transfer function profile can be performed for each primary color channel and for each eye, respectively. In some embodiments, different ghosting transfer function profiles can be obtained from different seating locations.

In FIG. 10, one test pattern image with a dark background 1002 represents the intended eye where ghosting is to be measured. A second test pattern image with a brighter background 1003 represents the unintended eye that may cause ghosting in the intended eye. Each test pattern image may contain circular disk patterns that mark the screen positions where an individual ghosting transfer function is to be applied. When these two test pattern images are displayed through a 3D display system, the disk patterns from these two images may match in positions. The test pattern for the intended eye may have a dark background 1006 with zero intensity, and the circular pattern 1008 at the center may have an adjustable intensity value of $I_{int}$ (1010). The unintended eye test pattern may have a brighter background 1007 with an intensity value of. $I_{un\ int}$, but its center circular pattern may have a zero intensity $I_{un\ int}=0$ (1011).

During calibration, these two test pattern images can be aligned with each other when displayed. The intensity values $I_{int}$ and $I_{un\ int}$ can be displayed in the same primary color, such as the green channel. In calibration, the background intensity of the unintended eye test pattern $I_{un\ int}$ can be gradually increased from 0 to a maximum level with an incremental step of $\Delta I$, causing an increase in the level of perceived ghosting $Y_g$ 1015 in the intended eye image 1012.

Some embodiments of the present invention measure ghosting transfer functions indirectly by increasing the intensity of each disk pattern 1016 in the intended eye image until its brightness $I_{int}$ matches the brightness of ghosting $Y_g$, as shown in 1017. This process can be repeated for each step increase of the background intensity of the unintended test pattern image, and, for each step, the corresponding code values $I_{int}$ and $I_{un\ int}$ can be saved. The measurements can be performed for each screen position marked by disk patterns in the test pattern images until a complete set of calibration data is collected. The above calibration process may be performed in all three primary colors, and it can be repeated for both the left eye channel and the right eye channel of a display system when the roles of unintended eye and intended eye are reversed.

In some embodiments, a common reference ghosting transfer function can be used in each eye for the screen positions for each color channel. For example, two reference ghosting transfer functions may used, instead of up to six—one for the left eye and one for the right eye, for each color channel. The ghosting transfer functions of every screen position can be modeled as a linear derivation from these two reference ghosting transfer functions. The following is an example of such a model:

$$T = aT_{ref} + b \quad (13)$$

where a and b are parameters. Using the model, the calibration process can be implemented using two full rounds of measurements to obtain one reference ghosting transfer function for each eye. The calibration may be performed on each color channel of each eye, but it may be possible to use a common reference ghosting transfer function for color channels of each eye, such as when a 3D display system exhibits linear color conformity.

To derive a ghosting transfer function from the model described in Equation (13), the corresponding parameters a and b can be measured by taking two point measurements at each screen location. For example, the unintended eye image intensity can be selected as $\mu > 0$ and 1 and the parameters a and b can be determined using the following linear equations $$\begin{cases} T(\mu) = aT_{ref}(\mu) + b \\ T(1) = aT_{ref}(1) + b \end{cases} \quad (14)$$

With Equation (14), the parameters a and b can be measured for each of the screen positions. The results may form a ghosting transfer function model parameter map. With the ghosting transfer function model map and the ghosting reference transfer functions, the ghosting transfer functions for the screen positions can be determined using Equation (13). For further simplification of calibration process, a 3D display area, such as a screen, can be divided into multiple segments, each having a distinct set of parameters. A ghosting transfer function model parameter map for each of the screen positions can be obtained by interpolation. Assuming N samples of one-dimensional image intensity for measuring ghosting transfer function of a color channel, both for the intended eye and the unintended eye, a brute force calibration method may include $O(N \times N \times 3 \times 2) = O(6N^2)$ measurements for the three color channels from each screen location and each viewing location. In some embodiments of the present invention, the calibration process may perform $O(2N+12)$ measurements for each screen location and each viewing position.

The test patterns of FIG. 10 each show five disk patterns, but the quantity, shape and distribution of the patterns in each test pattern image are not limited to what is depicted in FIG. 10.

The above calibration process may be repeated from different viewing positions relative to a 3D display so that multiple ghosting transfer function profiles can be obtained from different viewing positions. An optimal ghosting transfer function profile can be derived from multiple ghosting transfer function profiles using one of the methods disclosed by Equations (15)-(20).

A ghosting transfer function profile can be measured from each of the M selected viewing locations, and each profile may contain N ghosting transfer functions, $P_k = \{T_{k,1}, T_{k,1}, \ldots, T_{k,N}\}$, where $k = \{1, 2, \ldots, M\}$ with respect to N screen positions. An optimal ghosting transfer function profile $P_{optimal}$ may be a profile derived from M ghosting transfer function profiles $P_1, P_2, \ldots, P_M$. The optimal ghosting transfer function profile, $P_{optimal}$ can contain N ghosting transfer functions, each optimized for one of the N screen positions. One method to compute the optimal ghosting transfer function profile may be a mean method using the following equation:

$$P_{optimal} = \underset{k}{\text{MEAN}}(P_k) = \{\text{mean}(T_{k,1}), \text{mean}(T_{k,2}), \ldots, \text{mean}(T_{k,N})\} \quad (15)$$

An alternative method may be a minimum method using the following equation:

$$P_{optimal} = \underset{k}{\text{MIN}}(P_k) = \{\min(T_{k,1}), \min(T_{k,2}), \ldots, \min(T_{k,N})\} \quad (16)$$

Another alternative method may be a maximum method using the following equation:

$$P_{optimal} = \underset{k}{\text{MAX}}(P_k) = \{\max(T_{k,1}), \max(T_{k,2}), \ldots, \max(T_{k,N})\} \quad (17)$$

Another alternative method may be a median method using the following equation:

$$P_{optimal} = \quad (18)$$
$$\underset{k}{\text{MEDIAN}}(P_k) = \{\text{median}(T_{k,1}), \text{median}(T_{k,2}), \ldots, \text{median}(T_{k,N})\}$$

Another alternative method may be a weighted average method using the following equation:

$$P_{optimal} = \quad (19)$$
$$\sum_{k=1}^{M} w_k P_k = \left\{ \frac{\sum_{k=1}^{M} w_k T_{k,1}}{\sum_{k=1}^{M} w_k}, \frac{\sum_{k=1}^{M} w_k T_{k,2}}{\sum_{k=1}^{M} w_k}, \ldots, \frac{\sum_{k=1}^{M} w_k T_{k,N}}{\sum_{k=1}^{M} w_k} \right\}$$

The weights, $w_k$, can be determined based on different considerations, such as audience distribution in an auditorium. In one implementation of Equation (19), the weights can be assigned such that the "sweet spot" seating position, for example k=7, is considered instead of other positions:

$$P_{optimal} = P_k = \{T_{7,1}, T_{7,2}, \ldots, T_{7,N}\} \quad (20)$$

Once a method is selected, it can be repeatedly applied to each color channel and to each eye. Multiple profiles can be pre-calculated and stored in system ready for use. In some embodiments, the selection of profiles is performed automatically based on user input or pre-programmed display conditions.

An implementation of ghosting reduction methods according to one embodiment is shown in FIG. 4. FIG. 4 includes a ghosting reduction module 404, a calibration module 412, a user input device 414 and a 3D display system 418. Various types of system configurations can be derived from such an implementation to meet different application requirements. In one embodiment, the ghosting reduction module 404 is implemented as a real-time hardware device embedded in a 3D display system. An example of such a configuration is depicted in FIG. 8 in which a 3D display system includes a left eye projector 802, a right eye projector 804 and a screen 806. Both projectors are equipped with a hardware ghosting reduction modules 820, 822 that perform ghosting reduction processing in real time. The ghosting reduction modules 820, 822 can be implemented as a DSP device or an FPGA (field programmable gate array) or an FPOA (field programmable object array) device or a customised ASIC (application specific integrated circuit) device. In some embodiments, one device can perform the computing functions of an image analysis processor 406, a ghosting suppression processor 408 and a ghosting cancellation processor 410 as described in FIG. 4. The ghosting reduced image data can be directly displayed by the projectors 802, 804 onto the screen 806.

Some embodiments of the real-time ghosting reduction module 404 include a stand alone hardware device connected to a 3D display system through an external connection. Real-time performance of the module 404 in such a configuration can be achieved using a general purpose computer transformed into a special purpose computer configured with high performing graphics processing unit (GPU) cards and/or software to perform various methods according to various embodiments of the present invention. Such a configuration may allow computing tasks to be implemented in software, such as in OpenGL GLSL, Cg or CUDA, taking advantage of the computational power of the GPU. For example, a computer program product can be disposed in one or more hardwire devices, such as those described above or other devices such as a computer system or server. The computer program product may be implemented using software, hardware, or a combination of software and hardware. For example, the computer program product may include executable code stored on a computer-readable memory that, when executed, can cause the hardwire devices to perform actions according to various embodiments of the present invention. In some embodiments, the computer program product includes logic that configures the hardware devices to perform actions according to various embodiments of the present invention. Certain embodiments use GPU that may reduce the cost for the development of an embedded device and may provide flexibility for future feature upgrades. The ghosting reduced image data produced by the stand alone ghosting reduction module can be displayed directly on the 3D display system through the external connection.

Real-time implementations of ghosting reduction may allow the system parameters to be measured and stored in the modules so that ghosting reduction can be customized for individual 3D display systems. Such implementations may deliver highly effective ghosting reduction performance. As discussed previously, the performance of a ghosting reduction process may be a combined result from both ghosting suppression and ghosting cancellation. Both processes may rely on the accuracy of the measured display system parameters 122 to estimate perceived ghosting. In general, each 3D display system may exhibit distinctive display system parameters and such display system parameters may change as the conditions of the display system degrade over time. Examples of system condition degradation include the aging of light source, the deterioration of the display surface, and the deviation of color temperature. Since a real-time implementation can store the measured display system parameters inside the module, the display system parameters can be updated through a timely planned and frequently executed calibration process. A real-time ghosting reduction module can use relatively accurate and relatively up-to-date system parameters in ghosting reduction computing, which can be important for the performance of the ghosting cancellation process.

Some configurations, such as a real-time implementation, may use high-performing embedded hardware or a GPU to execute the computing tasks of image analysis, ghosting suppression and ghosting cancellation in real time. Such hardware or GPU implementations may be costly and sometimes prohibitive. For example, a local adaptive analysis module in a primary perceptual ghosting analysis process may be a computionally demanding process. To analyze content of most, if not all, every image frame, a local adaptive analysis module may use some advanced but also computationally demanding image analysis algorithms that may be costly to implement in real-time hardware. The costs may prohibit implementing such image analysis algorithms in the embedded hardware or in the GPU. In addition, a real-time ghosting reduction module may result from a design compromise between cost and performance, potentially offering a limited range of image analysis capabilities.

Figure 12:
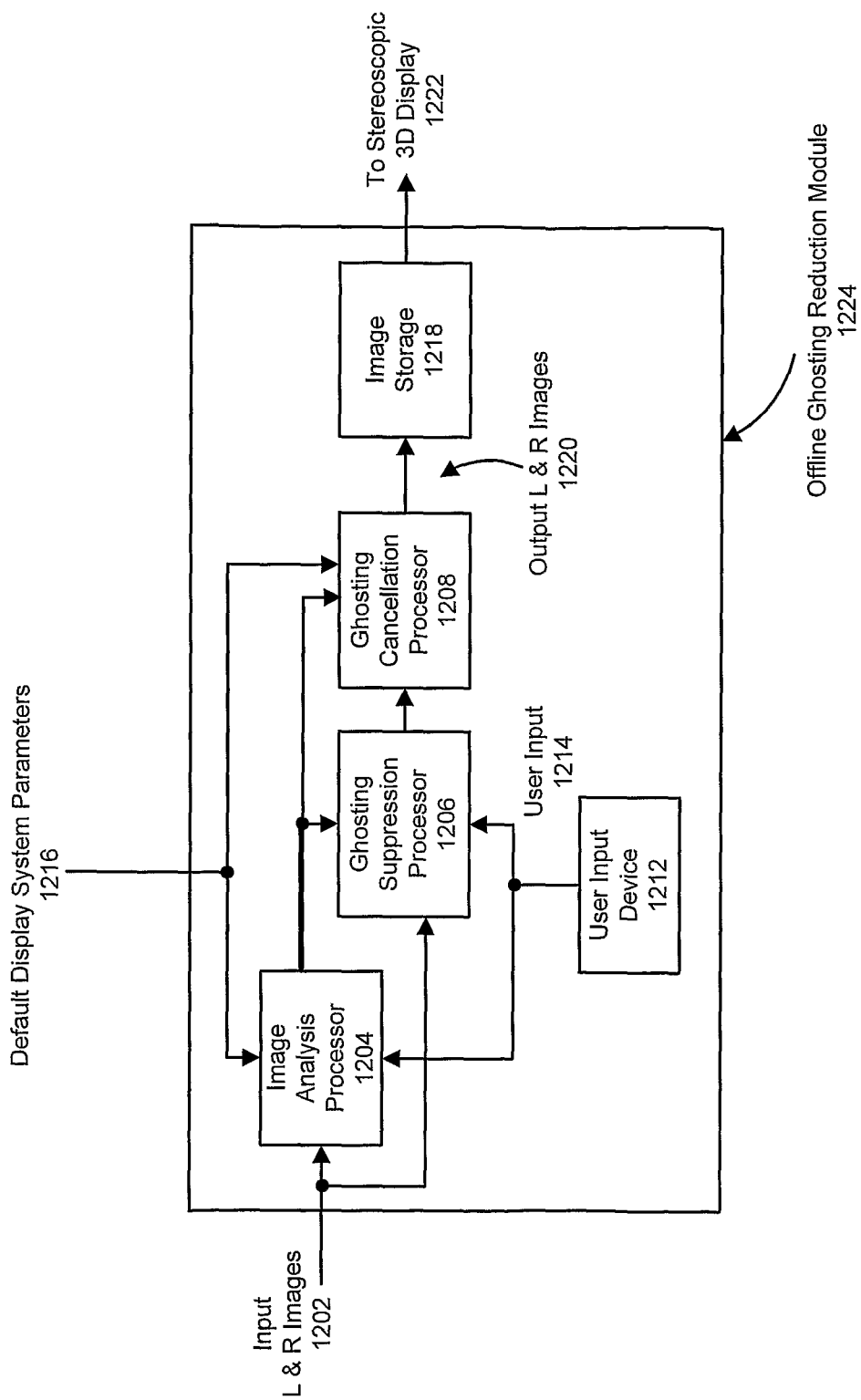
FIG. 12 is a block diagram of an offline system for reducing perceived ghosting according to one embodiment of the present invention.

Ghosting reduction modules according to some embodiments can be implemented as an offline software-based process without using real-time computation. An example of an offline implementation according to one embodiment is depicted in FIG. 12. FIG. 12 shows an image analysis processor 1204, a ghosting suppression processor 1206 and a ghosting cancellation processor 1208 implemented as software in separate stages through an offline computing process pipeline 1224. A user input device 1212 can be implemented as a software GUI application as part of the offline computing process pipeline 1224. The resulting ghosting reduced image data 1220 can be stored in a storage device 1218 to be outputted and distributed at a later time for a 3D display. Such an offline solution may allow relatively advanced and effective algorithms to be deployed in the image analysis processor 1204 without a significant increase in cost. For example, some offline implementations can use the latest advances in the field of image analysis and image processing to deliver effective content-based locally adaptive performance useful for ghosting suppression processor 1206.

Certain offline implementations may experience difficulty in providing accurate display system parameters for individual 3D display systems. For example, it may be costly or prohibitive to measure every 3D display system in advance, store the display system parameters, and implement customized offline computing to reduce ghosting in images for each 3D display system to which images are distributed. In some embodiments, a representative set of display system parameters are obtained from each type of 3D display systems so that a customized version of ghosting reduced image data is produced for each type of the display systems. In other embodiments, a default set of system parameters 1216 as shown in FIG. 12 is used to produce a universal version of ghosting reduced images for most, if not all, 3D display systems. The default display system parameters can be obtained by sampling a representative set of display system parameters previously measured from a representative set of 3D display systems using a stand alone calibration module. Offline implementation according to some embodiments can be compatible with various post-production processes for motion pictures or video.

Figure 11:
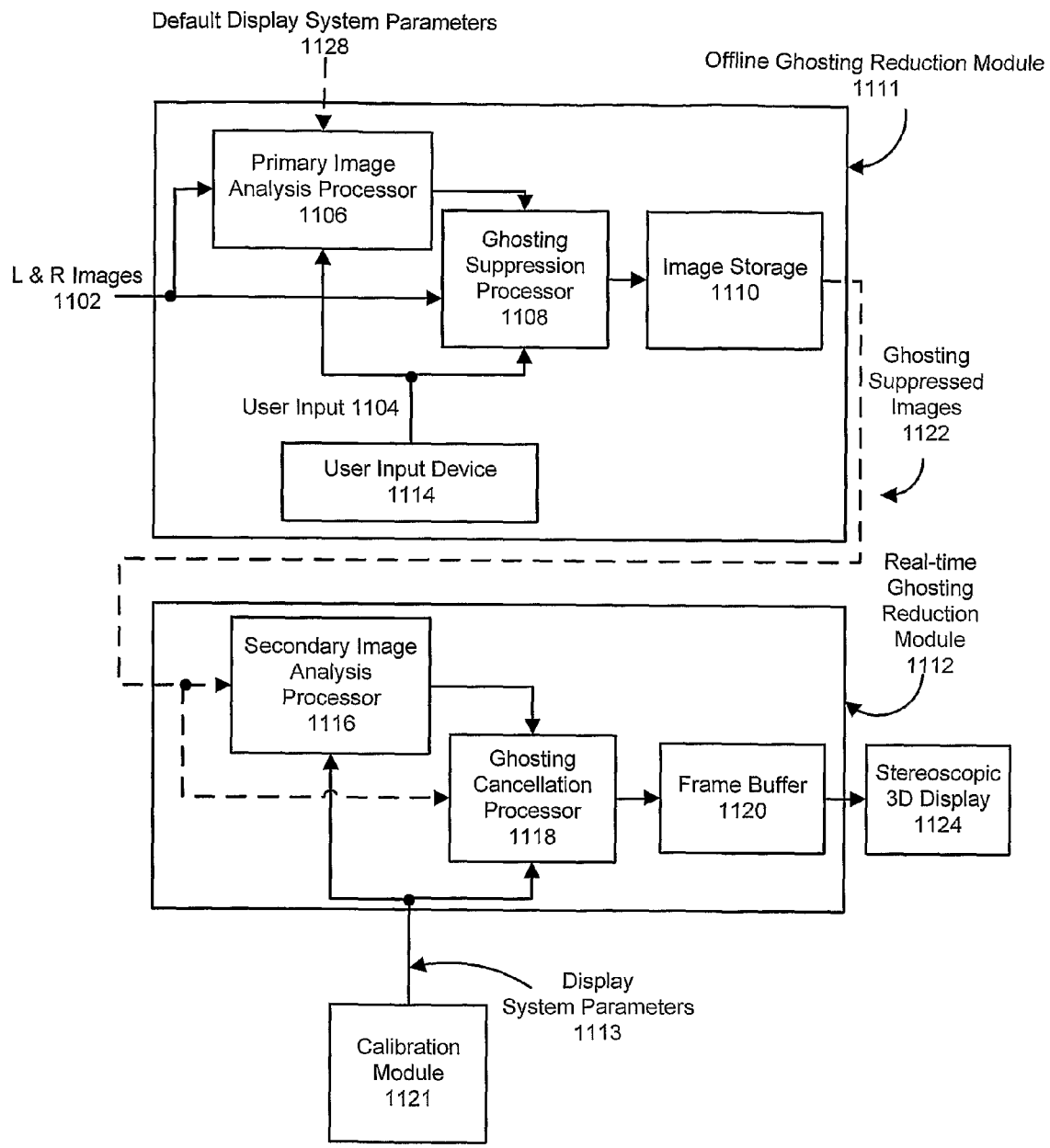
FIG. 11 is a block diagram of a hybrid system for reducing perceived ghosting according to one embodiment of the present invention.

Some ghosting reduction modules according to certain embodiments are implemented as a hybrid solution. In a hybrid solution, a portion of the computing processes of FIG. 4, for example, can be implemented as a real-time device while the remaining processes are implemented as a software-based offline process. One embodiment of a hybrid implementation is shown in FIG. 11. Computation-demanding ghosting suppression tasks can implemented in a software-based offline process through an offline ghosting reduction module 1111. The offline ghosting reduction module 1111 may use advanced image analysis methods to perform effective locally adaptive image analysis for ghosting suppression. Default system parameters 1128 maybe used by the offline ghosting reduction module 1111, which may not use customized computing for each 3D display system.

In the hybrid solution of FIG. 11, less computational-demanding ghosting cancellation processes can be implemented using a real-time ghosting reduction module 1112 that is connected to a 3D display system 1124 directly. The real-time ghosting reduction module 1112 may be implemented as a DSP device, an FPGA device, an FPOA device or a customized ASIC device embedded in a 3D display system 1124, or it can be implemented as a stand alone hardware device connected to the 3D display system. Updated display system parameters obtained from individual display systems can be stored in the real-time module and used by the secondary image analysis processor 1116 and ghosting cancellation processor 1118 to produce ghosting reduced image data for each individual 3D display system, similar to the real-time device of FIG. 8. Embodiments of the hybrid implementation can provide additional ghosting reduction performance by using advanced image analysis methods and by using updated display system parameters.

Calibration modules according to some embodiments can be implemented as an embedded device in a 3D display system or as a stand alone device, such as a mobile device with wireless connections. The calibration module can control the functions of a calibration process, such as by displaying test pattern images, generating and adjusting the intensity of test patterns, taking measurement by intensity matching, controlling image sensors and computing ghosting transfer functions. The display system parameters obtained by the process can be stored in a real-time device, such as a ghosting reduction module, a real-time ghosting reduction module 1112, or in a data storage of an offline process. Certain calibration modules may include a user input device for user interaction and control.

In certain real-time implementations, image sensors may replace human eye in the calibration process to provide automation. For the system depicted in FIG. 8, for example, a pair of image sensors 810, 812 equipped with appropriate polarizers 814 can capture the test pattern images from the screen 806. Software can control the change of test pattern intensity, analyze captured images, make intensity matching decisions and record results. Software may also compute ghosting transfer functions from the calibration results.

The foregoing is provided for purposes of illustrating, explaining, and describing embodiments of the present invention. Further modifications and adaptations to these embodiments will be apparent to those skilled in the art and may be made without departing from the scope or spirit of the invention.

The invention claimed is:
1. A method comprising:
receiving a stereoscopic image by a ghosting reduction module device prior to the stereoscopic image being displayed, the stereoscopic image comprising image content;
receiving at least one display system parameter by the ghosting reduction module device;
analyzing the stereoscopic image by the ghosting reduction module device using the image content of the stereoscopic image prior to the stereoscopic image being displayed to identify a first local region and a second local region, each of the first local region and the second local region comprising ghosting;
selecting a first psychovisual factor using the image content for the first local region;
selecting a second pyschovisual factor using the image content for the second local region;
generating a modified stereoscopic image from the stereoscopic image by reducing or eliminating the ghosting of the first local region and the second local region separately by using the first psychovisual factor, the second pyschovisual factor, and the at least one display system parameter in modifying the first local region differently than the second local region; and
outputting the modified stereoscopic image.

2. The method of claim 1, wherein the first psychovisual factor is based on the ghosting being within a non-perceptible threshold of an eye of a human.

3. The method of claim 2, wherein the non-perceptible threshold of the eye of the human is related to at least one of:
texture detail of the first local region;
motion of the first local region;
parallax of the first local region; or
transition of brightness of the first local region.

4. The method of claim 1, wherein the first psychovisual factor is based on a change in spatial brightness of the first local region within an undetectable limit of an eye of a human.

5. The method of claim 4, wherein the undetectable limit is increased when the first local region is brighter.

6. The method of claim 1, wherein the first psychovisual factor and the second psychovisual factor are based on non-linear characteristics of an eye of a human.

7. The method of claim 1, wherein generating the modified stereoscopic image from the stereoscopic image by reducing or eliminating the ghosting of the first local region and the second local region separately by using the first psychovisual factor, the second psychovisual factor, and the at least one display system parameter in modifying the first local region differently than the second local region, comprises:
analyzing (i) the first local region using the at least one display system parameter and the first psychovisual factor and (ii) the second local region using the at least one display system parameter and the second psychovisual factor, to generate a control mask comprising:
at least one computation applicable to the first local region and the second local region; and
a location and a scaling of the at least one computation applicable to the first local region and the second local region; and
generating the modified stereoscopic image by modifying the stereoscopic image using the control mask.

8. The method of claim 7, wherein generating the modified stereoscopic image by modifying the stereoscopic image using the control mask comprises applying the at least one computation to the stereoscopic image globally.

9. The method of claim 7, wherein the at least one computation comprises ghosting suppression.

10. The method of claim 9, wherein ghosting suppression comprises:
reducing highlight of the first local region; or
boosting background of the second local region.

11. The method of claim 7, wherein the at least one computation comprises ghosting cancellation.

12. The method of claim 11, wherein ghosting cancellation comprises:
solving a non-linear ghosting model equation based on the first psychovisual factor and the second psychovisual factor.

13. The method of claim 1, wherein the at least one display system parameter comprises a ghosting transfer function defined in a code space.

14. The method of claim 7, wherein analyzing (i) the first local region using the at least one display system parameter and the first psychovisual factor and (ii) the second local region using the at least one display system parameter and the second psychovisual factor, to generate the control mask comprises:
checking for binocular consistency; and
removing temporal artifacts.

15. The method of claim 1, further comprising:
obtaining the at least one display system parameter using a calibration process, the calibration process comprising:
displaying an intended eye image that is a first test pattern on a first eye channel of a stereoscopic display, the first test pattern comprising a dark background having at least one first test pattern localized area and an adjustable first brightness;
displaying a unintended eye image that is a second test pattern on a second eye channel of the stereoscopic display, the second test pattern comprising an image having a background comprising an adjustable second brightness and a second test pattern localized area that is dark, the second test pattern localized area being the same shape and size as the at least one first test pattern localized area and spatially aligned with the first test pattern localized area on the display;
adjusting the first brightness in a code space until the first brightness matches the second brightness on the first eye channel of the stereoscopic display for at least one second brightness level; and
determining the at least one display system parameter is a ghosting transfer function in code space based on adjustments to the first brightness and the second brightness for the at least one second brightness level.

16. A system comprising:
a device for receiving a plurality of original stereoscopic images prior to the stereoscopic images being displayed, the stereoscopic images comprising image content, at least one left eye image, and at least one right eye image;
a calibration module for determining at least one display system parameter;
an image analysis processor configured to:
identify a first local region and a second local region of the plurality of original stereoscopic images using the image content of the stereoscopic images prior to the stereoscopic images being displayed, each of the first local region and the second local region comprising ghosting;
select a first psychovisual factor using the image content for the first local region;
select a second psychovisual factor using the image content for the second local region; and
analyze (i) the first local region using the at least one display system parameter and the first psychovisual factor and (ii) the second local region using the at least one display system parameter and the second psychovisual factor, to generate a control mask comprising:
at least one computation applicable to the first local region and the second local region; and
a location and a scaling of the at least one computation applicable to the first local region and the second local region;
a computing processor configured to generate a modified image from the plurality of original stereoscopic images by reducing or eliminating ghosting of the first local region and the second local region separately by using the control mask in modifying the first local region differently than the second local region; and
a display device for outputting the modified image.

17. The system of claim 16, wherein the calibration module is configured to determine the at least one display system parameter by receiving brightness of a test pattern using an image sensor.

18. The system of claim 16, wherein the calibration module is configured to determine the at least one display system parameter by determining a default display system parameter is the at least one display system parameter.

19. The system of claim 16, wherein the computing processor comprises:
a ghosting suppression processor for suppressing the ghosting of the first local region and the second local region using a suppression control mask; and
a ghosting cancellation processor for cancelling the ghosting of the first local region and the second local region using a cancellation control mask.

20. The system of claim 19, wherein the image analysis processor comprises:
a primary image analysis processor for generating the suppression control mask; and
a secondary image analysis processor for generating the cancellation control mask, wherein the primary image analysis processor and the ghosting suppression processor are located in a first location and the secondary image analysis processor and the ghosting cancellation processor are located in a second location.

21. The system of claim 20, wherein the suppression control mask comprises:
a background control mask; and
a highlight control mask.

22. The system of claim 21, wherein the primary image analysis processor is configured to:
analyze the first local region and the second local region of the plurality of original stereoscopic images using the first psychovisual factor, and the second psychovisual factor, and the at least one display system parameter to formulate a residual leakage map, a ghosting region map, and a constraint map; and
generate the background control mask and the highlight control mask using the residual leakage map, the ghosting region map, and the constraint map.

23. The system of claim 16, wherein the calibration module is configured to determine the at least one display system parameter by performing a calibration process from a plurality of viewing positions for the display device.

24. The system of claim 23, wherein the calibration module is configured to determine the at least one display parameter by determining an optimal ghosting transfer function profile from a plurality of ghosting transfer function profiles determined from the plurality of viewing positions for the display device, wherein the optimal ghosting transfer function profile is determined by at least one of:
a mean process;
a minimum process;
a maximum process;
a median process; or
a weighted average process.

25. A computer program product including instructions stored on a non-transitory computer-readable medium disposed in a device, the instructions being configured to be executed to cause the device to perform actions, the actions comprising:
- identifying a first local region and a second local region of a stereoscopic image using image content of the stereoscopic image prior to the stereoscopic image being displayed, wherein the first local region and the second local region each comprises ghosting;
- selecting a first psychovisual factor for the first local region using the image content;
- selecting a second psychovisual factor for the second local region using the image content;
- generating a modified stereoscopic image from the stereoscopic image by reducing or eliminating the ghosting of the first local region and the second local region separately by using the first psychovisual factor, the second psychovisual factor, and at least one display system parameter in modifying the first local region differently than the second local region; and
- outputting the modified stereoscopic image.

26. The computer program product of claim 25, wherein generating the modified stereoscopic image from the stereoscopic image by reducing or eliminating the ghosting of the first local region and the second local region separately by using the first psychovisual factor, the second psychovisual factor, and at least one display system parameter in modifying the first local region differently than the second local region, comprises:
- analyzing the first local region and the second local region using the at least one display system parameter, the first psychovisual factor, and the second psychovisual factor to generate a control mask comprising:
  - at least one computation applicable to the first local region and the second local region; and
  - a location and a scaling of the at least one computation applicable to the first local region and the second local region; and
- generating the modified stereoscopic image by modifying the stereoscopic image using the control mask.

27. The computer program product of claim 25, wherein generating the modified stereoscopic image from the stereoscopic image by reducing or eliminating the ghosting of the first local region and the second local region separately by using the first psychovisual factor, the second psychovisual factor, and at least one display system parameter in modifying the first local region differently than the second local region, comprises:
- analyzing the first local region and the second local region using the at least one display system parameter, the first psychovisual factor, and the second psychovisual factor to generate a suppression control mask comprising:
  - at least one computation applicable to the first local region and the second local region; and
  - a location and a scaling of the at least one computation applicable to the first local region and the second local region;
- generating a ghosting suppressed image by modifying the stereoscopic image using the suppression control mask;
- analyzing the ghosting suppressed image using the at least one display system parameter, the first psychovisual factor, and the second psychovisual factor to generate a cancellation control mask comprising:
  - at least one computation applicable to the ghosting suppressed image; and
  - a location and a scaling of the at least one computation applicable to the ghosting suppressed image;
- generating the modified stereoscopic image by modifying the ghosting suppressed image using the cancellation control mask.

28. The computer program product of claim 27, wherein the suppression control mask comprises a background control mask and a highlight control mask,
- wherein analyzing the first local region and the second local region using the at least one display system parameter, the first psychovisual factor, and the second psychovisual factor to generate the suppression control mask comprises:
  - generating a residual leakage map, a ghosting region map, and a constraint map by analyzing the first local region and the second local region using the at least one display system parameter, the first psychovisual factor, and the second psychovisual factor;
  - generating the background control mask using the residual leakage map, the ghosting region map, and the constraint map; and
  - generating the highlight control mask using the residual leakage map, the ghosting region map, and the constraint map.

29. The computer program product of claim 28, further comprising:
- performing a binocular consistency check process and a temporal artifact removal process to modify the background control mask and the highlight control mask.

30. The computer program product of claim 27, wherein analyzing the ghosting suppressed image using the at least one display system parameter, the first psychovisual factor, and the second psychovisual factor to generate the cancellation control mask comprises:
- generating a ghosting region map and a constraint map by analyzing the ghosting suppressed image using the at least one display system parameter, the first psychovisual factor, and the second psychovisual factor; and
- generating the cancellation mask using the ghosting region map and the constraint map.

31. The computer program product of claim 30, further comprising:
- performing a binocular consistency check process and a temporal artifact removal process to generate the cancellation mask.

* * * * *